United States Patent
Kodama et al.

(10) Patent No.: US 7,119,160 B2
(45) Date of Patent: Oct. 10, 2006

(54) POLYALKENYL ETHER RESIN

(75) Inventors: Sai Kodama, Yokkaichi (JP); Shigeru Murata, Suzuka (JP); Toshihiro Inayama, Kuwana (JP); Tatsuo Niimi, Yokkaichi (JP)

(73) Assignee: Kyowa Hakko Chemical Co., Ltd., Tokyo (JP)

( * ) Notice: Subject to any disclaimer, the term of this patent is extended or adjusted under 35 U.S.C. 154(b) by 37 days.

(21) Appl. No.: 10/506,891

(22) PCT Filed: Apr. 3, 2003

(86) PCT No.: PCT/JP03/04281

§ 371 (c)(1),
(2), (4) Date: Sep. 27, 2004

(87) PCT Pub. No.: WO03/082945

PCT Pub. Date: Oct. 9, 2003

(65) Prior Publication Data

US 2005/0176889 A1 Aug. 11, 2005

(30) Foreign Application Priority Data

| Apr. 3, 2002 | (JP) | 2002-100744 |
| Aug. 20, 2002 | (JP) | 2002-238713 |
| Oct. 28, 2002 | (JP) | 2002-312091 |
| Feb. 10, 2003 | (JP) | 2003-032091 |

(51) Int. Cl.
*C08G 18/62* (2006.01)

(52) U.S. Cl. .................... 528/75; 528/271; 525/93; 525/123; 525/165; 522/90; 522/96; 522/114; 522/120; 526/262; 526/300; 526/319; 526/320; 526/321; 526/323.1; 526/323.2

(58) Field of Classification Search ............... 528/75, 528/271; 525/93, 123, 165; 522/90, 96, 522/114, 120; 526/262, 300, 319–321, 323.1, 526/323

See application file for complete search history.

(56) References Cited

U.S. PATENT DOCUMENTS 3,635,914 A * 1/1972 Daniels et al. .............. 526/304

FOREIGN PATENT DOCUMENTS

| EP | 1 227 108 | 7/2003 |
| JP | 2001-072728 | 3/2001 |

OTHER PUBLICATIONS

Bennevault, et al., "Polyurethane networks based on α,ω-dihydroxytelechelic and on random hydroxyl-functionalized side chain...", *Macromol. Chem. Phys.*, vol. 198 (1997), pp. 3051-3064.

* cited by examiner

*Primary Examiner*—Rachel Gorr
(74) *Attorney, Agent, or Firm*—Fitzpatrick, Cella, Harper & Scinto

(57) ABSTRACT

There are provided a polyalkenyl ether type polyurethane, which is excellent in flexibility, aor the like, and which has in the molecule, a structural unit represented by formula (XXX):

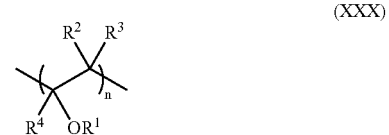

(XXX)

(wherein n represents an integer of 2 to 1000, $R^1$ represents substituted or unsubstituted lower alkyl, substituted or unsubstituted cycloalkyl, substituted or unsubstituted aryl, or substituted or unsubstituted aralkyl, and $R^2$, $R^3$ and $R^4$, which are the same or different, each represent a hydrogen atom, substituted or unsubstituted lower alkyl, substituted or unsubstituted cycloalkyl, substituted or unsubstituted aryl or substituted or unsubstituted aralkyl, and $R^1$s, $R^2$s, $R^3$s, and $R^4$s, when they are each present two or more in number, may be respectively the same or different), and the like.

26 Claims, No Drawings

POLYALKENYL ETHER RESIN

TECHNICAL FIELD

The present invention relates to a polyurethane, a polyester, and the like useful for applications such as paints, coating agents, inks, adhesives, films, fibers, photoresists, solder resists, semiconductor sealing materials, laminated sheets, shaping materials, sealing agents, molding materials, or the like, or the raw materials therefor.

BACKGROUND ART

A polyurethane, a polyester, an epoxy resin, and light/electron beam curable resins thereof have been widely used in applications such as paints, coating agents, inks, adhesives, photoresists, sealing agents, binders, and molding materials.

The above-mentioned resins having polyether skeletons, polydiene skeletons, or the like known in the art are not satisfactory in terms of flexibility, compatibility with low polarity resins, uniformity of composition, mechanical strength, solubility, stickiness, bonding property, adhesion, electrical insulation property, weather resistance, water resistance, transparency, results in a pressure cooker test which are the required characteristics of a substrate for an electronic circuit, and the like.

Macromolecular Chemistry and Physics, 198, 3051–3064 (1997) discloses a polyurethane having a poly(2-chloroethyl vinyl ether) skeleton. A resin having a poly(2-chloroethyl vinyl ether) skeleton has problems in stability, for example, that it causes a dechlorination reaction under heating conditions. Further, a 2-chloroethyl vinyl ether, which is the raw material therefor, has become a regulated substance in the Waste Disposal Law and the Living Environment Conservation Ordinance, and accordingly it is considered that the environment is adversely affected thereby.

DISCLOSURE OF THE PRESENT INVENTION

An object of the present invention is to provide a polyurethane, a polyester, and the like, which are excellent in flexibility, compatibility with a low polarity resin, uniformity of composition, mechanical strength, solubility, stickiness, bonding property, adhesion, electrical insulation property, weather resistance, water resistance, transparency, thermal aging resistance, results in a pressure cooker test, or the like.

The present invention provides the following (1) to (24):

(1) A polyurethane having, in the molecule, a structural unit represented by formula (XXX):

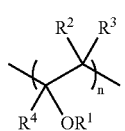

(XXX)

(wherein n represents an integer of 2 to 1000, $R^1$ represents a substituted or unsubstituted lower alkyl, substituted or unsubstituted cycloalkyl, substituted or unsubstituted aryl, or substituted or unsubstituted aralkyl, and $R^2$, $R^3$ and $R^4$, which are the same or different, each represent a hydrogen atom, substituted or unsubstituted lower alkyl, substituted or unsubstituted cycloalkyl, substituted or unsubstituted aryl, or substituted or unsubstituted aralkyl, and $R^1$s, $R^2$s, $R^3$s, and $R^4$s, when they are each present two or more in number, may be respectively the same or different). Hereinafter, the polyurethane also be reffered to as Polyurethane (I).

(2) A polyurethane having, in the molecule, a structural unit represented by formula (I):

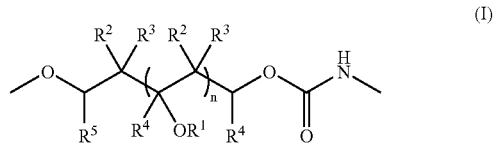

(I)

(wherein n, $R^1$, $R^2$, $R^3$ and $R^4$ respectively have the same meanings as defined above, $R^5$ represents a hydrogen atom, substituted or unsubstituted lower alkyl, substituted or unsubstituted cycloalkyl, substituted or unsubstituted aryl, or substituted or unsubstituted aralkyl).

(3) The polyurethane according to the above (1) or (2), wherein the weight-average molecular weight therof is 30000 to 1000000.

(4) An urethane acrylate having, in the molecule the structural unit represented by formula (XXX) described in the above (1). Hereinafter, the urethane acrylate also be referred to as Urethane acrylate (II).

(5) An urethane acrylate having, in the molecule a structural unit represented by formula (II):

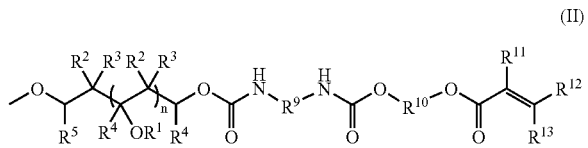

(II)

(wherein n, $R^1$, $R^2$, $R^3$, $R^4$, and $R^5$ respectively have the same meanings as defined above, $R^9$ represents a residue derived from a polyisocyanate compound, $R^{10}$ represent substituted or unsubstituted lower alkylene, substituted or unsubstituted cycloalkylene or substituted or unsubstituted arylene, and $R^{11}$, $R^{12}$ and $R^{13}$, which are the same or different, each represent a hydrogen atom, substituted or unsubstituted lower alkyl, substituted or unsubstituted cycloalkyl, substituted or unsubstituted aryl, or substituted or unsubstituted aralkyl).

(6) The urethane acrylate according to the above (4) or (5), wherein the number-average molecular weight thereof is 200 to 10000.

(7) A composition comprising the urethane acrylate according to any of the above (4) to (6) and a radical photo-, or thermal polymerization initiator.

(8) An urethane alkenyl ether having, in the molecule, the structural unit represented by formula (XXX) described in the above (1). Hereinafter, the urethane alkenyl ether also be reffered to as Urethane alkenyl ether (XI).

(9) An urethane alkenyl ether having, in the molecule, a structural unit represented by formula (XI):

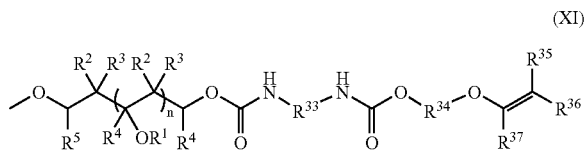
(XI)

(wherein n, $R^1$, $R^2$, $R^3$, $R^4$ and $R^5$ respectively have the same meanings as defined above, $R^{33}$ represents a residue derived from a polyisocyanate compound, $R^{34}$ represents substituted or unsubstituted lower alkylene, substituted or unsubstituted cycloalkylene, or substituted or unsubstituted arylene, and $R^{35}$, $R^{36}$ and $R^{37}$, which are the same or different, each represent a hydrogen atom, substituted or unsubstituted lower alkyl, substituted or unsubstituted cycloalkyl, substituted or unsubstituted aryl or substituted or unsubstituted aralkyl).

(10) The urethane alkenyl ether according to the above (8) or (9), wherein the number-average molecular weight thereof is 200 to 10000.

(11) A composition comprising the urethane alkenyl ether according to any of the above (8) to (10), and a polymerization initiator generating an acid through heating or light irradiation.

(12) A composition comprising the urethane alkenyl ether according to any of the above (8) to (10), and a compound having a maleimido group.

(13) A polyester derived from a polyol, said polyol having, in the molecule, a structural unit represented by formula (XXX) described in the above (1) and having hydroxyl groups at 2, 3 or 4 ends. Hereinafter, the polyester also be referred to as Polyester (III).

(14) A polyester having, in the molecule, a structural unit represented by formula (III):

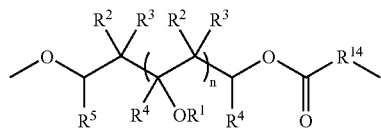
(III)

(wherein n, $R^1$, $R^2$, $R^3$, $R^4$ and $R^5$ respectively have the same meanings as defined above, and $R^{14}$ represents substituted or unsubstituted lower alkylene, substituted or unsubstituted cycloalkylene, or substituted or unsubstituted arylene).

(15) The polyester according to the above (13) or (14), wherein the weight-average molecular weight thereof is 30000 to 1000000.

(16) An ester acrylate derived from a polyol, said polyol having, in the molecule, a structural unit represented by formula (XXX) described in the above (1) and having hydroxyl groups at 2, 3 or 4 ends. Hereinafter, the ester acrylate also be referred to as Ester acrylate (IV).

(17) An ester acrylate having, in the molecule, a structural unit represented by formula (IV):

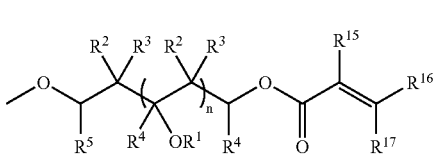
(IV)

(wherein n, $R^1$, $R^2$, $R^3$, $R^4$ and $R^5$ respectively have the same meanings as defined above, and $R^{15}$, $R^{16}$ and $R^{17}$, which are the same or different, each represent a hydrogen atom, substituted or unsubstituted lower alkyl, substituted or unsubstituted cycloalkyl, substituted or unsubstituted aryl, or substituted or unsubstituted aralkyl).

(18) The ester acrylate according to the above (16) or (17), wherein the number-average molecular weight thereof is 200 to 10000.

(19) A composition comprising the ester acrylate according to any of the above (16) to (18), and a radical photo-, or thermal polymerization initiator.

(20) An alkenyl ether having, in the molecule, the structural unit represented by formula (XXX) described in the above (1). Hereinafter, the alkenyl ether also be referred to as Alkenyl ether (V).

(21) An alkenyl ether having, in the molecule, a structural unit represented by formula (V):

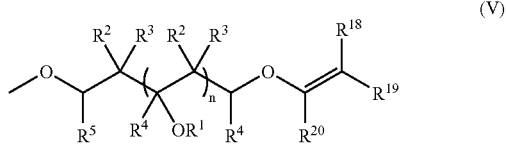
(V)

(wherein n, $R^1$, $R^2$, $R^3$, $R^4$, and $R^5$ respectively have the same meanings as defined above, $R^{18}$, $R^{19}$ and $R^{20}$, which are the same or different, each represent a hydrogen atom, substituted or unsubstituted lower alkyl, substituted or unsubstituted cycloalkyl, substituted or unsubstituted aryl, or substituted or unsubstituted aralykyl).

(22) The alkenyl ether according to the above (20) or (21), wherein the number-average molecular weight thereof is 200 to 10000.

(23) A composition comprising the alkenyl ether according to any of the above (20) to (22) and a polymerization initiator generating an acid through heating or light irradiation.

(24) A composition comprising the alkenyl ether according to any of the above (20) to (22) and a compound having a maleimido group.

The present invention will be described below in detail.

In the definition of groups in the above formulae, the lower alkyl includes a straight-chain or branched alkyl groups having 1 to 8 carbon atoms such as methyl, ethyl, propyl, isopropyl, butyl, sec-butyl, tert-butyl, isobutyl, pentyl, isopentyl, neopentyl, hexyl, heptyl, and octyl. As the lower alkylene, mentioned are the one obtained by removing one hydrogen atom from the above mentioned lower alkyl, and the like.

The cycloalkyl includes cycloalkyl groups having 3 to 10 carbon atoms such as cyclopropyl, cyclobutyl, cyclopentyl, cyclohexyl, cycloheptyl, cyclooctyl, cyclononyl, and cyclodecyl. As the cycloalkylene, mentioned are the one obtained by removing one hydrogen atom from the above-mentioned cycloalkyl, and the like.

The aryl and the aryl moiety of the aralkyl include aryls having 6 to 14 carbon atoms such as phenyl, naphthyl and anthryl. As the alkylene moiety of the aralkyl, mentioned are the one obtained by removing one or two hydrogen atoms from the above-mentioned lower alkyl, and the like. Specific examples of the aralkyl include benzyl, phenethyl, phenylpropyl, naphthylmethyl, naphthylethyl, and diphenylmethyl. As the arylene, mentioned are the one obtained by removing one hydrogen atom from the above mentioned aryl, and the like.

As the polyisocyanate compound in the residue derived from a polyisocyanate compound, examples include aromatic polyisocyanates such as diphenylmethane diisocyanate, 2,4-tolylene diisocyanate, 2,6-tolylene diisocyanate, p-phenylene diisocyanate, m-phenylene diisocyanate, 2,4-naphthalene diisocyanate, 1,5-naphthalene diisocyanate, and p-xylylene diisocyanate, alicyclic polyisocyanates such as isophorone diisocyanate, 4,4'-diisocyanate dicyclohexane, and 4,4'-diisocyanate dicyclohexylmethane, and aliphatic polyisocyanates such as hexamethylene diisocyanate, tetramethylene diisocyanate, lysine ester diisocyanate, and lysine ester triisocyanate.

As the residue derived from a polyisocyanate compound, preferred is substituted or unsubstituted lower alkylene, substituted or unsubstituted cycloalkylene, or substituted or unsubstituted arylene. As the lower alkylene, the cycloalkylene, and the arylene, mention be made of the same ones as described above, respectively. As the substituents in the substituted lower alkylene, the substituted cycloalkylene, and the substituted arylene, mention be made of the same ones as those exemplified in the definition of the substituent in the substituted lower alkyl described later.

As the substitutents in the substituted lower alkyl, the substituted cycloalkyl, the substituted aryl, the substituted aralkyl, the substituted lower alkylene, the substituted cycloalkylene, and the substituted arylene, examples include hydroxy, lower alkyl, lower alkoxy, lower alkoxycarbonyl, lower alkanoyl, cinnamoyloxy, aroyloxy, and a halogen atom. Although the number of substituents is not particularly limited, it is preferably 1 to 3.

In the definition of the substituents, the alkyl moieties of the lower alkyl, the lower alkoxy, the lower alkoxycarbonyl, and the lower alkanoyl, have the same meanings as the definition of the lower alkyl described above. As the aryl moiety of the aroyloxy, mention be made of the same ones as those exemplified in the definition of the aryl described above. As the halogen atom, mention be made of respective atoms of fluorine, chlorine, bromine, iodine, and astatine.

Among the polyurethanes having a structural unit represented by formula (I) in the molecule, the urethane acrylates having a structural unit represented by formula (II) in the molecule, the urethane alkenyl ethers having a structural unit represented by formula (XI) in the molecule, the polyesters having a structural unit represented by formula (III) in the molecule, the ester acrylates having a structural unit represented by formula (IV) in the molecule, and the alkenyl ethers having a structural unit represented by formula (V) in the molecule, compounds where $R^1$ is lower alkyl, and $R^2$, $R^3$, $R^4$ and $R^5$ are each a hydrogen atom are preferable, respectively.

(1) Raw Material Compound

A raw material for the polyurethane or the like of the present invention, preferred to a polyol having the structural unit represented by formula (XXX) in the molecule, and having hydroxyl groups (hereinafter, the polyol also be referred to as Compound A). More preferred to examples thereof include the compound represented by the formula (A):

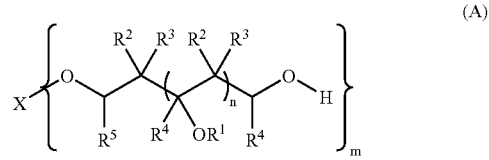

(A)

[wherein n, $R^1$, $R^2$ $R^3$, $R^4$ and $R^5$ have the same meanings as defined above, m represents an integer of 1 to 4, X represents a hydrogen atom, a substituted or unsubstituted lower alkylene, $-Q^1-A-Q^2-$(wherein A represents a substituted or unsubstituted cycloalkylene or a substituted or unsubstituted arylene, and $Q^1$ and $Q^2$, which are the same or different, and each denote a single bond or a substituted or unsubstituted lower alkylene), a substituted or unsubstituted lower alkanetriyl, formula (B)

(B)

(wherein $A^1$ represents a substituted or unsubstituted cycloalkanetriyl or a substituted or unsubstituted aromatic ring triyl, $Q^3$, $Q^4$ and $Q^5$, which are the same or different, each represents a single bond or a substituted or unsubstituted lower alkylene), or formula (C)

(C)

(wherein $A^2$ represents a carbon atom, a substituted or unsubstituted alicyclic hydrocarbon tetrayl or a substituted or unsubstituted aromatic hydrocarbon tetrayl, and $Q^6$, $Q^7$, $Q^8$ and $Q^9$, which are the same or different, each represents a single bond or a substituted or unsubstituted lower alkylene), and when m is 2 or more, respective n's be the same or different].

These raw materials can be obtained in the following manner. For example, the corresponding alkenyl ether monomer, and if required, a cation polymerizable monomer which is copolymerizable therewith are subjected to homopolymerization or copolymerization in the presence of a multifunctional initiator and Lewis acid with a known method [e.g., Mitsuo Sawamoto, SHINNKOUBUNNSHI JIKKENNGAKU 2 KOUBUNNSHI NO GOUSEI/HANNOU (1), p.p., 242–276, edited by the Society of Polymer Science, Japan, KYOURITSU SHUPPAN (1995)], to obtain a polyalkenyl ether (copolymer) having acetals at 2, 3 or 4 ends. The obtained copolymer is subjected to acid hydrolyzation to obtain be a polyalkenyl ether (copolymer) having formyl groups at 2, 3 or 4 ends. Finally, the resulting copolymer is subjected to a reduction treatment.

Specific examples of the alkenyl ether monomer include methyl vinyl ether, ethyl vinyl ether, isopropyl vinyl ether, n-butyl vinyl ether, isobutyl vinyl ether, 2-vinyloxyethyl benzoate, 2-acetoxyethyl vinyl ether, 2-ethoxyethyl vinyl ether, diethyl[2-(vinyloxy)ethyl]malonate, 3-tris(ethoxycarbonyl)propyl vinyl ether, 2-vinyloxyethyl cinnamate, cyclohexyl vinyl ether, 4-fluorobutyl vinyl ether, 3-bromobutyl vinyl ether, 4-ethoxybutyl vinyl ether, methylpropenyl ether, ethylpropenyl ether, isopropyl propenyl ether, n-butyl propenyl ether, isobutyl propenyl ether, cyclohexyl propenyl ether, n-propyl vinyl ether, 4-methyl-2-pentyl vinyl ether, n-hexyl vinyl ether, n-heptyl vinyl ether, 3-methyl-1-hexyl vinyl ether, 5-methyl-1-hexyl vinyl ether, and 2-ethyl-1-hexyl vinyl ether. These are used alone, or in mixture of two or more thereof.

The cation polymerizable monomer which is copolymerizable with an alkenyl ether monomer has no particular restriction. Specific preferred to examples thereof include styrene, α-methylstyrene, isobutene, N-vinyl carbazole, p-methoxystyrene, n-nonyl vinyl ether, isononyl vinyl ether, n-decyl vinyl ether, isodecyl vinyl ether, n-undecyl vinyl ether, isoundecyl vinyl ether, n-dodecyl vinyl ether, isododecyl vinyl ether, n-tridecyl vinyl ether, isotridecyl vinyl ether, n-tetradecyl vinyl ether, isotetradecyl vinyl ether, n-pentadecyl vinyl ether, isopentadecyl vinyl ether, n-hexadecyl vinyl ether, isohexadecyl vinyl ether, n-heptadecyl vinyl ether, isoheptadecyl vinyl ether, n-octadecyl vinyl ether, isooctadecyl vinyl ether, n-nonadecyl vinyl ether, isononadecyl vinyl ether, n-eicosyl vinyl ether, isoeicosyl vinyl ether, and n-hexadecyl propenyl ether. The amount of the copolymerizable monomers to be used is preferably 50 wt % or less based on the total amount of monomers to be used for polymerization.

As the multifunctional initiator usable are a compound represented by formula (X):

(X)

(wherein $R^{29}$ represents a hydrogen atom, a substituted or unsubstituted lower alkyl, a substituted or unsubstituted cycloalkyl, a substituted or unsubstituted aryl, or a substituted or unsubstituted aralkyl, $R^{30}$, $R^{31}$ and $R^{32}$, which are the same or different, each represents a substituted or unsubstituted lower alkyl, a substituted or unsubstituted cycloalkyl, a substituted or unsubstituted aryl, or a substituted or unsubstituted aralkyl), and a compound represented by formula (IX)

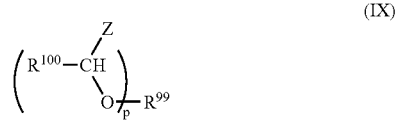

(IX)

[wherein $R^{99}$ represents a substituted or unsubstituted lower alkylene, $-Q^1-A-Q^2-$ (wherein A, $Q^1$ and $Q^2$ respectively have the same meanings as defined above), a substituted or unsubstituted lower alkanetriyl, formula (B):

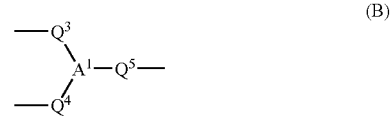

(B)

(wherein $A^1$, $Q^3$, $Q^4$, and $Q^5$ respectively have the same meanings as defined above), or formula (C):

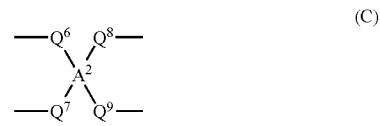

(C)

(where in the formula, $A^2$, $Q^6$, $Q^7$, $Q^8$, and $Q^9$ are respectively have the same meanings as defined above), $R^{100}$ represents a hydrogen atom, a substituted or unsubstituted lower alkyl, a substituted or unsubstituted cycloalkyl, a substituted or unsubstituted aryl, or a substituted or unsubstituted aralkyl, p represents an integer of 2 to 4, and Z represents a lower alkanoyloxy, a lower alkoxy, hydroxy, or a halogen atom].

In the definition of each group in formula (A), $-Q^1-A-Q^2-$, formula (B), formula (C), formula (X), and formula (IX), a substituted or unsubstituted lower alkyl, a substituted or unsubstituted cycloalkyl, a substituted or unsubstituted aryl, a substituted or unsubstituted aralkyl, a substituted or unsubstituted lower alkylene, a substituted or unsubstituted cycloalkylene, and a substituted or unsubstituted arylene respectively have the same meanings as defined above. The substituted or unsubstituted lower alkanetriyl include those obtained by removing two hydrogen atoms from the substituted or unsubstituted lower alkyl, or the like. The substituted or unsubstituted cycloalkanetriyl include those obtained by removing two hydrogen atoms from the substituted or unsubstituted cycloalkyl, or the like. As the aromatic ring moiety of a substituted or unsubstituted aromatic ring triyl, mentioned an aromatic ring having 6 to 14 carbon atoms. Specific examples thereof include benzene, naphthalene and anthracene. The substituted or unsubstituted alicyclic hydrocarbon tetrayl includes those obtained by removing 3 hydrogen atoms from the substituted or unsubstituted cycloalkyl, or the like. The substituted or unsubstituted aromatic hydrocarbon tetrayl include obtained by removing 3 hydrogen atoms from the substituted or unsubstituted aryl, or the like.

Examples of the substituents in a substituted aromatic ring triyl, a substituted alicyclic hydrocarbon tetrayl, and a substituted aromatic hydrocarbon tetrayl include hydroxy, lower alkyl, lower alkoxy, lower alkoxycarbonyl, lower alkanoyl, cinnamoyloxy, aroyloxy, and halogen atom. Although the number of substituents has no particular restriction, it is preferably 1 to 3.

In the definition of each substituent, as the alkyl moieties of lower alkyl, lower alkoxy, lower alkoxycarbonyl, and lower alkanoyl, mention be made of the same ones as those exemplified in the definition of the lower alkyl. As the aryl moieties of aroyloxy, mention be made of the same ones as those exemplified in the definition of the aryl. As the halogen atoms, mention be made of the same ones as those mentioned above.

More specific examples of the multifunctional initiator include organic acid, inorganic acid, and alcohol adducts of multifunctional alkenyl ethers.

Examples of the multifunctional alkenyl ether include ethylene glycol divinyl ether, propylene glycol divinyl ether, 1,4-butanediol divinyl ether, 1,6-hexanediol divinyl ether, 1,9-nonanediol divinyl ether, diethylene glycol divinyl ether, glycerin trivinyl ether, trimethylolpropane trivinyl ether, pentaerythritol tetravinyl ether, bisphenol F divinyl ether, bisphenol A divinyl ether, 1,3,5-tris (2-hydroxyethyl) cyanurate trivinyl ether, and vinyl ethers of phenol resins or novolak resins. As an organic acid to be added to a multifunctional alkenyl ether include formic acid, acetic acid, propionic acid, and butanoic acid; As an inorganic acid to be added to a multifunctional alkenyl ether, examples include hydrochloric acid, hydrobromic acid, and hydroiodic acid; and as the alcohol to be added to a multifunctional alkenyl ether, examples include methanol, ethanol, and (iso)propyl alcohol.

Lewis acids have no particular restriction, and preferred are metal halides or complexes thereof (such as diethyl ether complexes, acetic acid complexes, water complexes, and methanol complexes), and examples include $BCl_3$, $BF_3$, $BF_3 \cdot O(CH_2CH_3)_2$, $TiCl_4$, $SnCl_4$, $SnBr_4$, $AlCl_3$, $SbCl_5$, $SbF_5$, $WCl_6$, and $TaCl_5$, or complexes thereof. Among the examples, preferred are halides of tin, boron, or aluminum (such as $BF_3$, $SnCl_4$, and $AlCl_3$) or complexes thereof are preferred, and more preferred are $BF_3$(boron trifluoride) or complexes thereof. As the Lewis acid, used is the metal halaide in which the halogen atom is substituted with lower alkyl, lower alkoxy, phenoxy, or the like. Herein, the lower alkyl and the lower alkoxy respectively have the same meanings as defined above. The amount of Lewis acid to be used has no particular restriction, and is preferably 0.00001 to 3.0 mol per mole of the alkenyl ether monomer.

For the polymerization reaction, if required, the Lewis base be added. Examples of Lewis base include ethyl acetate, ethyl chloroacetate, diethyl carbonate, dioxane, tetrahydrofuran, diethyl ether, tetrahydrothiophene and 2,6-dimethylpyridine. The amount of the Lewis base to be used has no particular restriction, and is preferably 0.001 to 100 mol per mole of the alkenyl ether monomer.

The polymerization reaction be carried out in the presence of a solvent. The solvent has no particular restriction so long as it is inert to the reaction. Examples thereof include aromatic hydrocarbons such as benzene and toluene, hydrocarbon halides such as methyl chloride, methylene chloride and 1,2-dichloroethane, nitro compounds such as nitromethane and nitroethane, saturated hydrocarbons such as hexane, heptane, octane and nonane, and mixed solvents thereof. The amount of the solvent to be used has no particular restriction, and is preferably 0.5 to 100 parts by weight per part by weight of the alkenyl ether monomer.

The temperature of the polymerization reaction has no particular restriction, and is preferably −80 to 100° C.

The conversion from a polyalkenyl ether (copolymer) having acetals at its 2, 3, or 4 ends to a polyalkenyl ether (copolymer) having formyl groups at its 2, 3, or 4 ends by acid hydrolysis can be carried out in accordance with, for example, a known method [Tetrahedron, 43, 825 (1987), J. Org. Chem., 51, 567 (1986), JP-A-2001-11009, and the like]. The final reduction treatment can be carried out by, for example, a method in which reduction is carried out with hydrogen utilizing a metal catalyst such as Raney nickel, or a method in which reduction is carried out with boron hydride.

The method of acid hydrolysis is preferably a method in which heating with stirring is carried out in a mixed solvent of acetic acid and water.

(2) Polyurethane (I)

Polyurethane (I) of the present invention can be produced in accodance with known methods (U.S. Pat. No. 5,952,437, and the like) or in accordance with the methods using, for example, Compound A and a polyisocyanate compound, and if required, other polyols, a chain extender, a polymerization stop agent, and the like as raw materials.

As polyisocyanate compounds, mention be made of the same ones as those mentioned above, and these be used alone or in mixture of two or more thereof.

As the other polyols, mention be made of ethylene glycol, propylene glycol, 1,4-butanediol, 1,5-pentanediol, 1,6-hexanediol, hydroquinone, dimethylol propionic acid, dimethylol butanoic acid, trimethylolpropane, glycerin, and pentaerythritol, or polyester polyols obtained by allowing these polyols to react with polybasic acids, polyether polyols such as polytetramethylene ether glycol, polyethylene glycol, and polypropylene glycol, polyolefin polyols such as polybutadiene polyol, hydrogenated polybutadiene polyol, and polyisopurene polyol, polycarbonate ester polyol, polycaprolactone polyol, acryl polyol, and the like. Herein, examples of the polybasic acid include aliphatic dicarboxylic acids such as succinic acid, glutaric acid, adipic acid, sebacic acid, fumaric acid, maleic acid, and maleic anhydride, or acid anhydrides thereof, and aromatic dicarboxylic acids such as phthalic acid, isophthalic acid, terephthalic acid, 2,6-naphthalene dicarboxylic acid, dibenzoic acid, 4,4-diphenylene dicarboxylic acid, ethylenebis(p-benzoic acid), 1,4-tetramethylenebis(p-oxybenzoic acid), ethylenebis(p-oxybenzoic acid), and 1,3-trimethylenebis(p-oxybenzoic acid). Whereas, Polyurethane (I) obtainable using a polyol having an acidic group such as dimethylolpropionic acid or dimethylolbutanoic acid can be convert into an aqueous polyurethane resin by neutralizaing the acidic group (such as a carboxy group)in accordance With known methods (JP-A-5-194836, JP-A-8-27242, JP-A-8-259884, and the like), or in accordance with the methods described therein, using an organic base such as ammonia, triethylamine, propylamine, dibutylamine, amylamine, 1-aminooctane, 2-dimethyl aminoethanol, ethyl aminoethanol, 2-diethyl aminoethanol, 1-amino-2-propanol, 2-amino-1-propanol, 3-amino-1-propanol, 1-dimethylamino-2-propanol, 3-dimethylamino-1-propanol, 2-propyl aminoethanol, ethoxypropylamine, aminobenzyl alcohol, morpholine, piperidine, or piperazine, or an inorganic base such as sodium hydroxide, potassium hydroxide, sodium carbonate, or potassium carbonate is preferably used in an amount of 0.5 to 1.5 equivalents (molar ratio) based on the amount of the acidic group to neutralize the acidic group.

When the other polyols are used, Compound A is contained therein in an amount of, preferably 5 wt % or more, and more preferably 20 wt % or more based on the total amount of the polyol. However, when a hard one such as acryl polyol or isophthalic acid type polyester polyol is used as the other polyols, Compound A is contained therein in an amount of, preferably 0.5 wt % or more, and more preferably 2 wt % or more based on the total amount of the polyol.

As the chain extenders, low molecular weight polyols, diamines, alkanolamines, hydrazine, and the like are used.

Examples of the low molecular weight polyols include ethylene glycol, propylene glycol, 1,3-butanediol, 1,4-butanediol, 1,5-pentanediol, 1,6-hexanediol, hydroquinone, 2-ethyl-1,3-hexanediol, 2-butyl-2-ethyl-1,3-propanediol, and 2,4-diethyl-1,5-pentanediol.

Examples of the diamines include ethylenediamine, propylenediamine, tetramethylenediamine, hexamethylenediamine, isophoronediamine, and 1,4-cyclohexanediamine.

Examples of the alkanolamines include diethanolamine and triethanolamine.

Examples of the polymerization stop agents include dialkylamines such as dibutylamine, amines having hydroxyl groups such as monoethanolamine and diethanolamine, monoamine type amino acids such as glycine, alanine, glutamic acid and aminobutyric acid, alcohols such as ethanol and 2-propanol, or mixtures thereof.

The ratio of the number of moles of the isocyanate group to the total number of moles of the hydroxyl group and the amino group in the raw material is preferably 0.1 to 10, further preferably 0.5 to 3, and more preferably 0.8 to 2.

The reaction temperature is preferably 0 to 300° C.

For the production of Polyurethane (I) of the present invention, if required, a solvent be used. Examples of the solvents include ketones such as acetone, methyl ethyl ketone, and methyl isobutyl ketone, ethers such as tetrahydrofuran, aromatic hydrocarbons such as benzene, toluene, and xylene, and esters such ethyl acetate and butyl acetate. When diamines are used as chain extenders, alcohols such as methanol, ethanol, 2-propanol, and 1-butanol can also be used. These solvents are each preferably used in an amount of 0.5 to 100 parts by weight per part by weight of the raw materials for Polyurethane (I).

Further, for the production of Polyurethane (I) of the present invention, if required, organometal catalysts such as tin octylate, tetrabutoxytitanium, and di-n-butyl tin dilaurate, catalysts of tertiary amines such as triethylene diamine, and the like be used. In general, the amount thereof to be used is preferably 0.001 to 5 wt % based on the amount of the raw material for Polyurethane (I).

Polyurethane (I) of the present invention has no particular restriction as to the weight-average molecular weight. When it is used as a polyurethane elastomer or the like, the weight-average molecular weight is preferably 30000 to 1000000, further preferably 30000 to 500000, and more preferably 30000 to 300000. When Polyurethane (I) is used for ink, the weight-average molecular weight is preferably 1000 to 100000, and more preferably 1000 to 30000.

Polyurethane (I) of the present invention having the above-mentioned weight-average molecular weight are excellent in flexibility, compatibility with low polarity resins, uniformity of composition, solubility, stickiness, bonding property, adhesion, electrical insulation property, weather resistance, water resistance, transparency, thermal aging resistance, results in a pressure cooker test, and the like.

Polyurethane (I) of the present invention further contains, if required, conventional additives such as a phenol type antioxidant, a sulfur-having antioxidant, a phosphorous-having antioxidant, an ultraviolet absorber, a hindered amine type photostabilizer, an antistatic agent, an inorganic colloid sol such as colloidal silica or colloidal alumina, a silane coupling agent, a coloring agent, a wax agent, an antiseptic agent, an anti-foaming agent, a plasticizer, a slipping agent, a catalyst, a viscosity modifier, a leveling agent, an antigelling agent, a filler, a solvent, a film-forming aid, a dispersant, a thickener, and a perfume is used. For example, when Polyurethane (I) of the present invention as a polyurethane paint or a lacquer, it further contain cellulose derivatives such as cellulose nitrate or cellulose acetate-propionate cellulose acetate-butylate. These additives be added during the production of Polyurethane (I).

Examples of a phenol type antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylenebis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3, 5-di-tert-butyl-4-hydroxyphenyl)propionate, thiodiethylene glycol bis[(3,5-di-tert-butyl-4-hydroxyphenyl)propionate], 1,6-hexamethylenebis[(3,5-di-tert-butyl-4-hydroxyphenyl) propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl)propionate]methane, 3,9-bis{1,1-dimethyl-2-[(3-tert-butyl-4-hydroxy-5-methylphenyl) propionyloxy]ethyl}-2,4,8,10-tetraoxaspiro[5.5]undecane and triethylene glycol bis[(3-tert-butyl-4-hydroxy-5-methylphenyl)propionate].

Examples of a sulfur-having antioxidant include dialkyl thiodipropionates such as dilauryl thiodipropionate, dimyristyl thiodipropionate, and distearyl thiodipropionate, and β-alkyl mercaptopropionic acid esters of polyol such as pentaerythritol tetra(β-dodecyl mercapto propionate).

Examples of a phosphorous-having antioxidant include tris(nonylphenyl)phosphite, tris(2,4-di-tert-butylphenyl) phosphite, tris[2-tert-butyl-4-(3-tert-butyl-4-hydroxy-5-methylphenylthio)-5-methylphenyl]phosphite, tridecyl phosphite, octyl diphenyl phosphite, didecyl monophenyl phosphite, di(tridecyl) pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl) pentaerythritol diphosphite, bis(2,4-dicumylphenyl) pentaerythritol diphosphite, tetra(tridecyl) isopropylidene diphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, tetrakis (2,4-di-tert-butylphenyl)biphenylene diphosphonite, 9,10-dihydro-9-oxa-10-phosphaphenanthrene-10-oxide, 2,2'-methylenebis(4,6-tert-butylphenyl)-2-ethylhexyl phosphite, 2,2'-methylenebis(4, 6-tert-butylphenyl)octadecyl phosphite, 2,2'-ethylidenebis (4,6-di-tert-butylphenyl)fluorophosphite, tris{2-[(2,4,8,10-tetrakis-tert-butyldibenzo[d,f][1,3,2]dioxaphosphepin-6-yl) oxy]ethyl}amine, and a phosphite of 2-ethyl-2-butyl propylene glycol and 2,4,6-tri-tert-butylphenol.

These antioxidants are each used in an amount of 0.001 to 10 parts by weight, and more preferably 0.05 to 5 parts by weight per 100 parts by weight of Polyurethane (I).

Examples of the ultraviolet absorber include 2-hydroxybenzophenones such as 2,4-dihydroxybenzophenone, 2-hydroxy-4-methoxybenzophenone, 2-hydroxy-4-octoxybenzophenone, and 5,5'-methylenebis(2-hydroxy-4- methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-benzotriazolyl)phenol, and 2-(2'-hydroxy-3'-tert-butyl-5'-carboxyphenyl)benzotriazole; benzoates such as phenyl salicylate, resorcinol monobenzoate, 2,4-di-tert-butylphenyl 3,5-di-tert-butyl-4-hydroxybenzoate, 2,4-di-tert-amylphenyl-3,5-di-tert-butyl-4-hydroxybenzoate, and hexadecyl 3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate, and methyl-2-cyano-3-methyl-3-(p-methoxyphenyl)acrylate; and triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

Examples of the hindered amine type photostabilizer include 1-oxy-2,2,6,6-tetramethyl-4-piperidinol, 1-hydroxy-2,2,6,6-tetramethyl-4-piperidinol, 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, tetrakis(2,2,6,6-tetramethyl-4-piperidyl) butane tetracarboxylate, tetrakis(1,2,2,6,6-pentamethyl-4-piperidyl)-1,2,3,4-butane tetracarboxylate, bis(2,2,6,6-tetramethyl-4-piperidyl)/di(tridecyl)-1,2,3,4-butane tetracarboxylate, bis(1,2,2,6,6-pentamethyl-4-piperidyl)/di(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/dibromoethane polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis{2,4-bis[N-butyl-N-(2,2,6,6-tetramethyl-4-piperidyl)amino]-s-triazin-6-yl}-1,5,8,12-tetraazadodecane, 1,5,8,12-tetrakis{2,4-bis[N-butyl-N-(1,2,2,6,6-pentamethyl-4-piperidyl)amino]-s-triazin-6-yl}-1,5,8,12-tetraazadodecane, 1,6,11-tris{2,4-bis[N-butyl-N-(2,2,6,6-tetramethyl-4-piperidyl)amino]-s-triazin-6-ylamino}undecane, and 1,6,11-tris{2,4-bis[N-butyl-N-(1,2,2,6,6-pentamethyl-4-piperidyl)amino]-s-triazin-6-ylamino}undecane.

The ultraviolet absorber or the hindered amine type photostabilizer is used in an amount of preferably 0.001 to 30 parts by weight, and more preferably 0.05 to 10 parts by weight per 100 parts by weight of Polyurethane (I).

Polyurethane (I) of the present invention is useful for applications such as paints, coating agents, inks, adhesives, photoresists, solder resists, shaping materials, sealing agents, or molding materials, or the raw materials therefore.

(2-1) Urethane Acrylate (II)

Urethane acrylate (II) of the present invention be produced by using, for example, Compound A, a polyisocyanate compound, and a hydroxyl group-having acrylate represented by the formula (D):

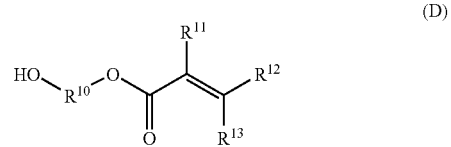

(wherein $R^{10}$, $R^{11}$, $R^{12}$ and $R^{13}$ respectively have the same meanings as defined above), and, if required, other polyols, diamines, and the like as raw materials.

In this case, the ratio of the number of moles of the isocyanate group to the number of moles of the hydroxyl group in the raw materials is preferably 0.1 to 10, further preferably 0.5 to 3, and more preferably 0.8 to 2.

As the polyisocyanate compounds, mention be made of the same ones as those described above. These can be used alone, or in mixture of two or more thereof.

Examples of the hydroxyl group-containing acrylate include 2-hydroxyethyl (meth)acrylate, 2-hydroxypropyl (meth)acrylate, and 2-hydroxybutyl (meth)acrylate. In this specification, (meth)acrylate means acrylate or methacrylate, and other acrylic acid or methacrylic acid derivatives are also referred to in the same manner.

As the other polyols and the diamines, mention be made of the same ones as the other polyols and the diamines mentioned in the description of (2), respectively.

Urethane acrylate (II) of the present invention can be produced with a known method such as a solution method or a melting method (a one-shot method, a prepolymer method, or the like).

The reaction temperature is preferably 50 to 100° C., and more preferably 55 to 85° C.

It is preferable to add an inhibitor of radical polymerization for the purpose of preventing the polymerization of vinyl groups, during the reaction. Examples of the inhibitor of radical polymerization include hydroquinone, hydroquinone monomethyl ether, and phenothiazine. These are each preferably used in an amount of 0.001 to 5 wt % based on the amount of the raw materials for Urethane acrylate (II).

When the reaction is effected with the solution method, a solvent is used, and as the solvents, mention be made of a radical photopolymerizable monomer, ketones such as methyl ethyl ketone and methyl isobutyl ketone, ethers such as tetrahydrofuran and diethylene glycol monoethyl ether acetate, aromatic hydrocarbons such as benzene, toluene and xylene, and the like.

Examples of the radical photopolymerizable monomer include monofunctional compounds and multifunctional compounds. Examples of the monofunctional compounds include 2-hydroxyethyl (meth)acrylate, 2-hydroxypropyl (meth)acrylate, 2-hydroxybutyl(meth)acrylate, methyl (meth)acrylate, ethyl(meth)acrylate, propyl (meth)acrylate, isopropyl(meth)acrylate, butyl (meth)acrylate, amyl (meth)acrylate, isobutyl(meth)acrylate, tert-butyl (meth)acrylate, pentyl(meth)acrylate, isoamyl(meth)acrylate, hexyl(meth)acrylate, heptyl(meth)acrylate, octyl (meth)acrylate, isooctyl(meth)acrylate, 2-ethylhexyl (meth)acrylate, nonyl(meth)acrylate, decyl(meth)acrylate, isodecyl(meth)acrylate, undecyl(meth)acrylate, dodecyl (meth)acrylate, lauryl (meth)acrylate, octadecyl (meth)acrylate, stearyl(meth)acrylate, tetrahydrofurfuryl (meth)acrylate, butoxyethyl(meth) acrylate, ethoxydiethylene glycol(meth)acrylate, benzyl (meth)acrylate, cyclohexyl (meth)acrylate, phenoxyethyl (meth)acrylate, polyethylene glycol mono(meth)acrylate, polypropylene glycol mono(meth)acrylate, methoxy ethylene glycol(meth)acrylate, ethoxyethoxyethyl(meth)acrylate, methoxy polyethylene glycol (meth) acrylate, methoxy polypropylene glycol(meth)acrylate, dicyclopentadiene (meth)acrylate, dicyclopentanyl (meth)acrylate, dicyclopentenyl(meth)acrylate, tricyclodecanyl(meth)acrylate, isobornyl(meth)acrylate, bornyl(meth)acrylate, diacetone (meth)acrylamide, isobutoxymethyl(meth)acrylamide, N-vinyl pyrrolidone, N-vinyl caprolactam, N,N-dimethyl(meth) acrylamide, tert-octyl(meth)acrylamide, dimethylaminoethyl (meth)acrylate, diethylaminoethyl (meth)acrylate, 7-amino-3,7-dimethyloctyl(meth)acrylate, N,N-diethyl (meth)acrylamide, N,N'-dimethylaminopropyl (meth)acrylamide, (meth)acryloylmorpholine, maleic acid esters, and fumaric acid esters. The commercially available products of the monofunctional compounds include ARONIX M111, M113, M114, and M117 (all produced by To a Gosei Kagaku Kogyo Co., Ltd.), KAYARAD TC110S, R629, and R644 (all produced by NIPPON KAYAKU Co., Ltd.), VISCOAT 3700 (produced by Osaka Organic Chemistry Co., Ltd.), and the like. Examples of the multifunctional compounds include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropane trioxyethyl (meth)acrylate, tris(2-hydroxyethyl)isocyanurate tri(meth) acrylate, tris(2-hydroxyethyl)isocyanurate di(meth)acrylate, tricyclodecane dimethanol di(meth)acrylate, epoxy(meth) acrylate obtained by the addition of (meth)acrylate to diglycidyl ether of bisphenol A, and triethylene glycol divinyl ether. The commercially available products of the multifunctional compounds include Yupimer UV SA1002 and SA2007 (all produced by Mitsubishi Chemical Corp.), Viscoat 700 (produced by Osaka Organic Chemical Industry Co., Ltd.), KAYARAD R-604, DPCA-20, DPCA-30, DPCA-60, DPCA-120, HX-620, D-310, and D-330 (all produced by Nippon Kayaku Co., Ltd.), ARONIX M-210, M-215, M-315, and M-325 (all produced by Toa Gosei Kagaku Kogyo Co., Ltd.), and the like.

Whereas, If required, a catalyst also be used for the reaction. As the catalysts, mention be made of the same ones as the catalysts used for the production of Polyurethane (I) mentioned in the description of (2). The amount of the catalyst to be used is preferably 0.001 to 5 wt % based on the amount of the raw materials of Urethane acrylate (II).

a composition having Urethane acrylate (II) and a radical photo-, or thermal polymerization initiator (which also be referred to hereinafter as Composition A) is obtained by mixing Urethane acrylate (II) of the present invention with a polymerization initiator generating radicals through light irradiation or heating (radical photo-, or thermal polymerization initiator), and if required, the radical photopolymerizable monomer, further, if required, other radical photopolymerizable polymers or oligomers, and the like.

For the preparation of Composition A, the order of addition of these components, the mixing method thereof, and the like have no particular restriction.

As a the other radical photopolymerizable polymers or oligomers, mention be made of urethane (meth)acrylate other than the urethane acrylates of the present invention, polyester (meth)acrylate, epoxy(meth)acrylate, polyamide (meth)acrylate, polysiloxane having a (meth)acryloyloxy group.

The number-average molecular weight of Urethane acrylate (II) containes in Composition A is preferably 200 to 10000, and more preferably 500 to 5000.

Example of the radical thermal polymerization initiators include azo compounds such as 2,2'-azobisisobutyronitrile, 2,2'-azobis-2-methylbutyronitrile, 2,2'-azobis-2,4-dimethylvaleronitrile, 1,1'-azobis-1-cyclohexanecarbonitrile, dimethyl-2,2'-azobisisobutyrate-4,4'-azobis-4-cyanovaleric acid, 2,2'-azobis (2-amidinopropene)dihydrochloride, 2-tert-butylazo-2-cyanopropane, 2,2'-azobis(2-methylpropionamide)dihydrate and 2,2'-azobis(2,4,4-trimethylpentane), peroxy esters such as tert-butyl peroxyneodecanoate, tert-butyl peroxypivalate, tert-butyl peroxy-2-ethyl hexanoate, tert-butyl peroxyisobutyrate, tert-butyl peroxylaurate, tert-butyl peroxyisophthalate, tert-butyl peroxyacetate, tert-butyl peroxyoctoate, and tert-butylperoxybenzoate, diacyl peroxides such as benzoyl peroxide, hydroperoxides such as cumene hydroperoxide, methyl ethyl ketone peroxide, potassium persulfate, 1,1-bis(tert-butyl peroxy)-3,3,5-trimethylcyclohexane, dialkyl peroxides or peroxy dicarbonates, hydrogen peroxide, and the like.

The content of the radical thermal polymerization initiator is preferably 0.2 to 20 parts by weight, and more preferably 1 to 10 parts by weight per 100 parts by weight of Urethane acrylate (II).

Examples of the radical photopolymerization initiator include benzoins such as benzoin and benzoin methyl ether, benzophenones such as benzophenone, methylbenzophenone, and 4,4'-dichlorobenzophenone, and 4,4'-bisdiethyl aminobenzophenone, acetophenones such as acetophenone, 2,2-dimethoxy-2-phenylacetophenone, 2,2-diethoxy-2-phenylacetophenone, 1-hydroxycyclohexyl phenyl ketone, N,N-dimethyl aminoacetophenone and 2-methyl-1-[4-(methylthio)phenyl]-2-morpholinopropan-1-one, anthraquinones such as 2-methyl anthraquinone, 2-ethyl anthraquinone, 1-chloroanthraquinone, 2-amyl anthraquinone, and 2-amino anthraquinone, thioxanthones such as 2,4-dimethyl thioxanthone, 2,4-diethyl thioxanthone, 2-chlorothioxanthone, 2,4-diisopropyl thioxanthone and 2-isopropyl thioxanthone, ketals such as acetophenone dimethyl ketal and benzyl dimethyl ketal.

The content of the radical photopolymerization initiator is preferably 0.2 to 20 parts by weight, and more preferably 1 to 10 parts by weight per 100 parts by weight of Urethane acrylate (II).

Composition A is cured through heating to 50 to 200° C. (when it contains a radical thermal polymerization initiator), or through irradiation with an infrared ray, a visible ray, an ultraviolet ray, an electron beam, α, β, or γ ray, or the like (when it contains a radical photopolymerization initiator).

Composition A is useful for applications such as a coating agent, a photoresist, or a solder resist.

The polyurethane obtainable from polymerization of Urethane acrylate (II) contained in the cured product resulting from curing of Composition A is also included in the concept of the polyurethane of the present invention.

Urethane acrylate (II) of the present invention further contain therein, if required, conventional additives such as a cationic photopolymerizable polymer/oligomer/monomer, a cationic photoinitiator, a phenol type antioxidant, a sulfur-having antioxidant, a phosphorous-having antioxidant, an ultraviolet absorber, a hindered amine type photostabilizer, an antistatic agent, an inorganic colloid sol such as colloidal silica or colloidal alumina, a silane coupling agent, a coloring agent, a wax agent, an antiseptic agent, an antifoaming agent, a plasticizer, a slipping agent, a catalyst, a viscosity modifier, a leveling agent, an anti-gelling agent, a filler, a solvent, a film-forming aid, a dispersant, a thickener, and a perfume. These additives be added when Urethane acrylate (II) is produced.

As the phenol type antioxidants, the sulfur-having antioxidants, the phosphorus-having antioxidants, the ultraviolet absorbers, and the hindered amine type photostabilizers, mention be made of the same ones as those mentioned in the description of (2).

Urethane acrylate (II) of the present invention is useful for applications such as paints, coating agents, inks, adhesives, films, fibers, photoresists, solder resists, semiconductor sealing materials, laminated sheets, shaping materials, and sealing agents, or the like. Particularly, it is suitable for applications such as coating agents (particularly, a covering coating agent for an optical fiber) and adhesives.

(2-2) Urethane Alkenyl Ether (XI)

Urethane alkenyl ether (XI) of the present invention can be produced by using, for example, Compound A, a polyisocyanate, and a hydroxyl group-having alkenyl ether represented by formula (E):

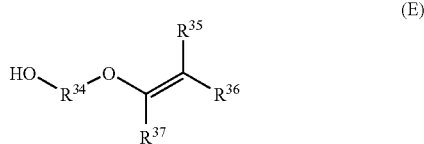

(wherein $R^{34}$, $R^{35}$, $R^{36}$ and $R^{37}$ respectively have the same meanings as defined above.), and if required, other polyols, diamine, and the like, as raw materials.

In this case, the ratio of the number of moles of the isocyanate group to the number of moles of the hydroxyl group in the raw materials is preferably 0.1 to 10, further preferably 0.5 to 3, and more preferably 0.8 to 2.

As the polyisocyanates, mention be made of the same ones as the polyisocyanates mentioned in the description of (2).

The hydroxyl group-having alkenyl ether is preferably a compound obtained by the reaction of an alkyl or cycloalkyl compound having two or more hydroxyl groups in the molecule, and acetylene. Examples thereof include 2-hydroxyethyl vinyl ether, 2-hydroxypropylvinyl ether, 4-hydroxybutylvinyl ether, 2-hydroxybutyl vinyl ether, 3-hydroxybutyl vinyl ether, 2-hydroxy-2-methylpropyl vinyl ether, 5-hydroxypentyl vinyl ether, 6-hydroxyhexyl vinyl ether, and cyclohexane dimethanol monovinyl ether.

As the other polyols and the diamines, mention be made of the same ones as the other polyols and the diamines mentioned in the description of (2), respectively.

Urethane alkenyl ether (XI) of the present invention can be produced with a known method such as a solution method or a melting method (a one-shot method, a prepolymer method, or the like).

The reaction temperature is preferably 50 to 100° C., and more preferably 55 to 85° C.

Although the solvents used in the solution method have no particular restriction, mention be made of a cationic photopolymerizable monomer, ketones such as methyl ethyl ketone and methyl isobutyl ketone, ethers such as tetrahydrofuran, aromatic hydrocarbons such as benzene, toluene and xylene, and the like.

Examples of the cationic photopolymerizable monomer include an epoxy group-having compound (a), a vinyl compound (b), a dicyclo ortho ester compound (c), a spiro ortho carbonate compound (d), and an oxetane ring-having compound (e). There is no problem even if these are used alone, or in combination of two or more thereof. Among the compounds (a) to (e), compounds (a) and (e) are particularly preferred to. Examples of the epoxy group-having compound (a) include 3,4-epoxycyclohexylmethyl-3,4-epoxycyclohexane carboxylate, bis-(3,4-epoxycyclohexyl)adipate, 2-(3,4-epoxycyclohexyl-5,5-spiro-3,4-epoxy)cyclohexanone-m-dioxane, bis(2,3-epoxycyclopentyl)ether, limonene dioxide, 4-vinylcyclohexene dioxide, phenyl glycidyl ether, bisphenol type epoxy resins such as bisphenol A type epoxy resin, bisphenol F type epoxy resin, hydrogenated bisphenol A type epoxy resin, and brominated bisphenol A type epoxy resin, novolak type epoxy resins such as phenol novolak type epoxy resin, cresol novolak type epoxy resin, and brominated phenol/novolak type epoxy resin, and polyglycidyl ethers of polyhydric alcohols. Examples of the vinyl compound (b) include styrenes such as styrene, α-methylstyrene, and p-chloromethylstyrene; alkyl vinyl ethers such as n-butyl vinyl ether, isobutyl vinyl ether, cyclohexyl vinyl ether, and hydroxybutyl vinyl ether; alkenyl vinyl ethers such as allyl vinyl ether and 1-octahydronaphthyl vinyl ether; alkynyl vinyl ethers such as ethynyl vinyl ether and 1-methyl-2-propenyl vinyl ether; aryl vinyl ethers such as phenyl vinyl ether and p-methoxyphenyl vinyl ether; alkyl divinyl ethers such as butanediol divinyl ether, triethylene glycol divinyl ether, and cyclohexanediol divinyl ether; aralkyl divinyl ethers such as 1,4-benzene dimethanol divinyl ether and m-phenylene bis (ethylene glycol) divinyl ether; aryl divinyl ethers such as hydroquinone divinyl ether and resorcinol divinyl ether. Examples of the dicyclo ortho ester compound (c) include 1-phenyl-4-ethyl-2,6,7-trioxabicyclo[2,2,2]octane and 1-ethyl-4-hydroxymethyl-2,6,7-trioxabicyclo[2,2,2]octane. Examples of the spiro ortho carbonate compound (d) include 1,5,7,11-tetraoxaspiro[5,5]undecane, 3,9-dibenzyl-1,5,7,11-tetraoxaspiro[5,5]undecane, 1,4,6-trioxaspiro[4,4]nonane, and 1,4,6-trioxaspiro[4,5]decane. Examples of the oxetane ring-having compound (e) include 3,3-dimethyl oxetane, 3,3-bis (chloromethyl)oxetane, 2-hydroxymethyl oxetane, 3-methyl-3-oxetanemethanol, 3-methyl-3-methoxymethyl oxetane, 3-ethyl-3-phenoxymethyl oxetane, resorcinol bis (3-methyl-3-oxetanyl ethyl)ether, and m-xylylenebis(3-ethyl-3-oxetanyl ethyl ether). These compounds are used alone, or in combination of two or more thereof.

Further, for the urethanization reaction, if required, organometal catalysts such as tin octylate, dibutyltin dilaurate, and tetrabutoxytitanium and urethanization catalysts of tertiary amines such as triethylenediamine be used. The amount thereof to be used is preferably 0.001 to 5 wt % based on the amount of the reaction solution.

A composition having Urethane alkenyl ether(XI) and a polymerization initiator generating an acid through heating or light irradiation (which also be referred to hereinafter as Composition B) can be obtained by mixing urethane alkenyl ether(XI) of the present invention with a polymerization initiator generating an acid through heating or light irradiation, if required, the cationic photopolymerizable monomer, and further, if required, other cationic photopolymerizable polymers or oligomers, and the like. For the preparation of Composition B, the order of addition of these components, the mixing method thereof, and the like have no particular restriction.

The number-average molecular weight of Urethane alkenyl ether (XI) for use in Composition B is preferably 200 to 10000, and more preferably 500 to 5000.

As the polymerization initiators generating an acid through heating, mention be made of a compound obtained by neutralizing a Bronsted acid or a Lewis acid with a Lewis base, a complex compound comprising a Lewis acid and a Bronsted acid, a complex compound comprising a Lewis acid and a Bronsted base, sulfonic acid esters, phosphoric acid esters, onium compounds, and the like.

Examples of the Bronsted acid include sulfuric acid, sulfonic acid, acetic acid, phosphoric acid, boric acid, and carboxylic acid, and derivatives thereof, and preferred are alkylbenzenesulfonic acid having 1 to 50 carbon atoms such as dodecylbenzenesulfonic acid, mono-, or di-halogenocarboxylic acids having 1 to 50 carbon atoms such as chloroacetic acid and dichloroacetic acid, phosphoric acid mono-, or di-esters having 1 to 50 carbon atoms such as monomethyl phosphate and dimethyl phosphate, and the like. These Bronsted acids can be used alone, or in combination of two or more thereof.

As the Lewis acid, preferred are metal halides and organometallic compounds, and specific examples thereof include metal halides such as boron trifluoride, aluminum trichloride, titanous chloride, titanic chloride, ferrous chloride, ferric chloride, zinc chloride, zinc bromide, stannous chloride, stannic chloride, stannous bromide, and stannic bromide, and organometallic compounds such as trialkyl boron, trialkyl aluminum, dialkyl aluminum halide, monoalkyl aluminum halide, tetraalkyl tin, aluminum acetyl acetonate, iron acetyl acetonate, zirconium acetyl acetonate, dibutyltin acetyl acetonate, dibutyltin dilaurate, dioctyltin ester maleate, magnesium naphthenate, calcium naphthenate, manganese naphthenate, iron naphthenate, cobalt naphthenate, copper naphthenate, zinc naphthenate, zirconium naphthenate, lead naphthenate, calcium octylate, manganese octylate, iron octylate, cobalt octylate, zinc octylate, zirconium octylate, tin octylate, lead octylate, zinc laurate, magnesium stearate, aluminum stearate, calcium stearate, cobalt stearate, zinc stearate, and lead stearate. These Lewis acids can be used alone or in combination of two or more thereof.

Examples of the Lewis base include amines such as ammonia, triethylamine, pyridine, aniline, morpholine, N-methylmorpholine, pyrrolidine, N-methylpyrrolidine, piperidine, N-methylpiperidine, cyclohexylamine, N-butylamine, dimethyloxazoline, imidazole, N-methylimidazole, N,N-dimethyl ethanolamine, N,N-diethyl ethanolamine, N,N-dimethyl isopropanolamine, N,N-diethyl isopropanolamine, N,N-dipropyl isopropanolamine, N,N-dibutyl isopropanolamine, N-methyl diethanolamine, N-ethyl diethanolamine, N-propyl diethanolamine, N-butyl diethanolamine, N-methyl diisopropanolamine, N-butyl diisopropanolamine, triethanolamine, triisopropanolamine, and tri-sec-butanolamine; amide compounds such as N,N-dimethylformamide, N,N-dimethylacetamide, N-methylpyrrolidone, and hexamethylphosphoric acid triamide; sulfoxide compounds such as dimethylsulfoxide; ether compounds such as diethyl ether and tetrahydrofuran; thioether compounds such as dimethyl sulfide; phosphoric acid ester compounds such as trimethyl phosphate, triethyl phosphate, and tributyl phosphate; boric acid ester compounds such as trimethyl borate; carboxylic acid ester compounds such as ethyl acetate and butyl acetate; carbonic acid ester compounds such as ethylene carbonate; and trialkyl phosphine compounds such as tributyl phosphine.

The ratio of the basic activity of the Lewis base to the acidic activity of the Bronsted acid or the Lewis acid is preferably 0.1 to 10.

The content of the polymerization initiator generating an acid through heating is preferably 0.01 to 10 parts by weight, and more preferably 0.02 to 5 parts by weight per 100 parts by weight of Urethane alkenyl ether (XI).

Composition B having a polymerization initiator generating an acid through heating is generally cured through heating at 50 to 200° C. for 2 minutes to 10 hours.

As the polymerization initiator generating an acid through light irradiation, mentioned are an onium salt compound, a sulfone compound, a sulfonic acid ester compound, a sulfonimide compound, a diazosulfone compound, a disulfonyl methane compound, a nitrobenzyl compound, and a naphthoquinone diazide compound.

Examples of the onium salt compound include an iodonium salt, a sulfonium salt, a phosphonium salt, a diazonium salt, an ammonium salt, and a pyridium salt. Specific examples thereof include bis(4-tert-butylphenyl)iodonium trifluoromethanesulfonate, bis(4-tert-butylphenyl)iodonium nonafluorobutanesulfonate, bis(4-tert-butylphenyl)iodonium-2-trifluoromethylbenzene sulfonate, bis(4-tert-butylphenyl)iodonium-10-camphorsulfonate, bis(4-tert-butylphenyl)iodonium p-toluenesulfonate, diphenyliodonium trifluoromethanesulfonate, diphenyliodonium nonafluorobutanesulfonate, diphenyliodonium-2-trifluoromethylbenzene sulfonate, diphenyliodonium-10-camphorsulfonate, diphenyliodonium-p-toluenesulfonate, triphenylsulfonium trifluoromethane sulfonate, triphenylsulfonium nonafluorobutane sulfonate, triphenylsulfonium-2-trifluoromethylbenzene sulfonate, triphenylsulfonium-10-camphorsulfonate, triphenylsulfonium-p-toluenesulfonate, 4-tert-butylphenyl diphenylsulfonium trifluoromethane sulfonate, 4-tert-butylphenyl diphenylsulfonium nonafluorobutane sulfonate, 4-tert-butylphenyl diphenylsulfonium-2-trifluoromethylbenzene sulfonate, 4-tert-butylphenyl diphenylsulfonium-10-camphorsulfonate, 4-tert-butylphenyl diphenylsulfonium-p-toluenesulfonate, 4-tert-butoxyphenyl diphenylsulfonium trifluoromethane sulfonate, 4-tert-butoxyphenyl diphenylsulfonium nonafluorobutane sulfonate, 4-tert-butoxyphenyl diphenylsulfonium-2-trifluoromethylbenzene sulfonate, 4-tert-butoxyphenyl diphenylsulfonium-10-camphorsulfonate, and 4-tert-butoxyphenyl diphenylsulfonium-p-toluene sulfonate.

Examples of the sulfone compound include β-ketosulfone and β-sulfonyl sulfone, and α-diazo compounds thereof. Specific examples thereof include phenacylphenylsulfone, mesitylphenacylsulfone, bis(phenylsulfonyl)methane, and 4-tris(phenacyl)sulfone.

Examples of the sulfonic acid ester compound include alkyl sulfonic acid ester, haloalkyl sulfonic acid ester, aryl sulfonic acid ester, and iminosulfonate. Specific examples thereof include benzoin tosylate, pyrogallol tris(trifluorosulfonate), pyrogallol methane sulfonic acid triester, nitrobenzyl-9,10-diethoxyanthracene-2-sulfonate, α-methylolbenzoin octanesulfonate, α-methylolbenzoin trifluoromethanesulfonate, and α-methylolbenzoin dodecylsulfonate.

Examples of the sulfonimide compound include N-(trifluoromethylsulfonyloxy)succinimide, N-(trifluoromethylsulfonyloxy)phthalimide, N-(trifluoromethylsulfonyloxy)diphenylmaleimide, N-(trifluoromethylsulfonyloxy)bicyclo[2.2.1]hept-5-ene-2,3-dicarboxyimide, N-(trifluoromethylsulfonyloxy)-7-oxabicyclo[2.2.1]hept-5-ene-2,3-dicarboxyimide, N-(trifluoromethylsulfonyloxy)bicyclo[2.2.1]heptane-5,6-dioxy-2,3-dicarboxyimide, N-(trifluoromethylsulfonyloxy)naphthylimide, N-(camphorsulfonyloxy)succinimide, N-(camphorsulfonyloxy)phthalimide, N-(camphorsulfonyloxy)diphenylmaleimide, N-(camphorsulfonyloxy)dicyclo[2.2.1]hept-5-ene-2,3-dicarboxyimide, N-(camphorsulfonyloxy)-7-oxabicyclo

[2.2.1]hept-5-ene-2,3-dicarboxyimide, N-(camphorsulfonyloxy)bicyclo[2.2.1]heptane-5,6-dioxy-2,3-dicarboxyimide, N-(camphorsulfonyloxy)naphthylimide, N-(4-methylphenylsulfonyloxy)succinimide, N-(4-methylphenylsulfonyloxy)phthalimide, N-(4-methylphenylsulfonyloxy)diphenylmaleimide, N-(4-methylphenylsulfonyloxy)bicyclo[2.2.1]hept-5-ene-2,3-dicarboxyimide, N-(4-methylphenylsulfonyloxy)-7-oxabicyclo[2.2.1]hept-5-ene-2,3-dicarboxyimide, N-(4-methylphenylsulfonyloxy)bicyclo[2.2.1]heptane-5,6-dioxy-2,3-dicarboxyimide, N-(4-methylphenylsulfonyloxy)naphthylimide, N-(2-trifluoromethylphenylsulfonyloxy)succinimide, N-(2-trifluoromethylphenylsulfonyloxy)phthalimide, N-(2-trifluoromethylphenylsulfonyloxy)diphenylmaleimide, N-(2-trifluoromethylphenylsulfonyloxy)bicyclo[2.2.1]hept-5-ene-2,3-dicarboxyimide, N-(2-trifluoromethylphenylsulfonyloxy)-7-oxabicyclo[2.2.1]hept-5-ene-2,3-dicarboxyimide, N-(2-trifluoromethylphenylsulfonyloxy)bicyclo[2.2.1]heptane-5,6-dioxy-2,3-dicarboxymide, N-(2-trifluoromethylphenylsulfonyloxy)naphthylimide, N-(4-fluorophenylsulfonyloxy)succinimide, N-(4-fluorophenylsulfonyloxy)phthalimide, N-(4-fluorophenylsulfonyloxy)diphenylmaleimide, N-(4-fluorophenylsulfonyloxy)bicyclo[2.2.1]hept-5-ene-2,3-dicarboxyimide, N-(4-fluorophenylsulfonyloxy)bicyclo[2.2.1]heptane-5,6-oxy-2,3-dicarboxyimide, and N-(4-fluorophenylsulfonyloxy)naphthylimide.

The polymerization initiators generating an acid through light irradiation can be used alone, or in combination of two or more thereof. The content thereof is preferably 0.01 to 50 parts by weight, more preferably 0.1 to 30 parts by weight, and further preferably 0.5 to 25 parts by weight per 100 parts by weight of Urethane alkenyl ether (XI).

Composition B having the polymerization initiator generating an acid through light irradiation is cured through irradiation with an infrared ray, a visible ray, an ultraviolet ray, an electron beam, α, β, or γ ray, or the like.

A composition having Urethane alkenyl ether (XI) and a compound having a maleimido group (which also be referred to hereinafter as Composition C) can be obtained by mixing Urethane alkenyl ether (XI) of the present invention and a compound having a maleimido group. For the preparation of Composition C, the order of addition of these components, the mixing method thereof, and the like have no particular restriction.

The number-average molecular weight of Urethane alkenyl ether (XI) for use in Composition C is preferably 200 to 10000, and more preferably 500 to 5000.

The compound having a maleimido group has no particular restriction so long as it is a compound having one or more maleimido groups in the molecule, and examples thereof include aliphatic maleimide compounds such as N-methylmaleimide, N-butylmaleimide, N-hydroxyethylmaleimide, 2,2,4-trimethylhexamethylene dimaleimide and 2,4,4-trimethylhexamethylene dimaleimide, aromatic maleimide compounds such as N-(methoxyphenyl)maleimide, 4,4-diphenylmethane bismaleimide and N,N'-xylylene bismaleimide, and cyclic ring-having maleimide compounds such as N-cyclohexylmaleimide and methylenebis(4-N-cyclohexylmaleimide).

In Composition C, the ratio of the number of moles of the maleimido group to the number of moles of Urethane alkenyl ether (XI) is preferably 0.001 to 3.0, and more preferably 0.5 to 1.5.

Composition C is cured through irradiation with an infrared ray, a visible ray, an ultraviolet ray, an electron beam, α, β, or γ ray, or the like. In this step, Composition C also be mixed with a radical photopolymerization initiator. Alternatively, composition C is also cured by being mixed with a radical thermal polymerization initiator, and being heated to 50 to 200° C.

As the radical photopolymerization initiators and the radical thermal polymerization initiators, mention be made of the same ones as the radical photopolymerization initiators and the radical thermal polymerization initiators for use in the production of Urethane acrylate (II), mentioned in the description of (2-1), respectively.

Urethane alkenyl ether (XI) of the present invention further contain, if required, conventional additives such as a radical photopolymerizable polymer/oligomer/monomer, a radical photoinitiator, a phenol type antioxidant, a sulfur-having antioxidant, a phosphorous-having antioxidant, an ultraviolet absorber, a hindered amine type photostabilizer, an antistatic agent, an inorganic colloid sol such as colloidal silica or colloidal alumina, a silane coupling agent, a coloring agent, a wax agent, an antiseptic agent, an anti-foaming agent, a plasticizer, a slipping agent, a catalyst, a viscosity modifier, a leveling agent, an anti-gelling agent, a filler, a solvent, a film-forming aid, a dispersant, a thickener, and a perfume. These additives may be added during the production of Urethane alkenyl ether (XI).

As the phenol type antioxidants, the sulfur-having antioxidants, the phosphorus-having antioxidant, the ultraviolet absorbers, and the hindered amine type photostabilizers, mention be made of the same ones as those mentioned in the description of (2).

Compositions B and C are useful for applications such as a coating agent, a photoresist, and a solder resist.

The polyurethane obtainable from polymerization of Urethane alkenyl ether (XI) contained in each cured product resulting from curing of Compositions B and C is also included in the concept of the polyurethane of the present invention.

(3) Polyester (III)

Polyester (III) of the present invention can be produced, for example, using Compound A [preferably the compound represented by formula (A), wherein X is a hydrogen atom], a polybasic acid, and if required, other polyols, an animal or vegetable oil fatty acid, an animal or vegetable oil, and the like as raw materials with known methods (U.S. Pat. No. 6,143,840, and the like), or similar methods thereto. The amount of the polybasic acid to be used is preferably 10 to 80 wt %, and more preferably 25 to 60 wt % based on the total amount of the raw materials. The amount of the alcohol components (Compound A and the other polyols) to be used is preferably 10 to 80 wt %, and more preferably 25 to 60 wt % based on the total amount of the raw materials.

The ratio of the number of moles of the hydroxyl group to the number of moles of the carboxyl group in the raw materials is preferably 0.8 to 1.5, and more preferably 0.9 to 1.3.

As the polybasic acids, mention may be made of the same ones as the polybasics mentioned in the description of (2).

As the other polyols, mention may be made of the same ones as the polyols mentioned in the description of (2). When the other polyols are used, Compound A is contained in an amount of preferably 5% (molar ratio) or more, and more preferably 20% (molar ratio) or more based on the amount of the alcohol components in the raw materials.

Examples of the animal or vegetable oil fatty acid include soybean oil fatty acid, safflower oil fatty acid, tall oil fatty acid, linseed oil fatty acid, dehydrated castor oil fatty acid, and tung oil fatty acid.

Examples of the animal or vegetable oil include soybean oil, safflower oil, linseed oil, dehydrated castor oil, and tung oil.

When the animal or vegetable oil fatty acid or the animal or vegetable oil is used, it is each preferably used in an amount of 20 wt % or less based on the total amount of the raw materials.

The weight-average molecular weight of Polyester (III) of the present invention has no particular restriction. It is preferably 30000 to 1000000, further preferably 30000 to 500000, and more preferably 30000 to 300000 when Polyester (III) is used as a polyester elastomer, etc.

Polyesters (III) of the present invention having the above-mentioned weight-average molecular weight is excellent in flexibility, compatibility with low polarity resins, uniformity of composition, mechanical strength, solubility, stickiness, bonding property, adhesion, electrical insulation property, weather resistance, water resistance, transparency, thermal aging resistance, oil resistance, moldability in injection molding, results in a pressure cooker test, and the like.

Polyester (III) of the present invention further contain, if required, conventional additives such as a phenol type antioxidant, a sulfur-having antioxidant, a phosphorous-having antioxidant, an ultraviolet absorber, a hindered amine type photostabilizer, an antistatic agent, an inorganic colloid sol, such as colloidal silica or colloidal alumina, a silane coupling agent, a coloring agent, a wax agent, an antiseptic agent, an anti-foaming agent, a plasticizer, a slipping agent, a catalyst, a viscosity modifier, a leveling agent, an anti-gelling agent, a filler, a solvent, a film-forming aid, a dispersant, a thickener, and a perfume, to be used. These additives may be added during the production Polyester (III).

As the phenol type antioxidant, the sulfur-having antioxidant, the phosphorous-having antioxidant, the ultraviolet absorber, and the hindered amine type photostabilizer, mention may be made of the same ones mentioned in the description of (2).

A composition obtained by mixing Polyester (III) of the present invention with an amino resin (such as an urea resin, a melamine resin, or a guanamine resin obtainable by allowing urea, melamine, guanamine, or the like to react with formaldehyde) is useful for a paint, a coating agent, an adhesive, or the like. The amount of the amino resin to be used is preferably 5 to 60 parts by weight per 100 parts by weight of Polyester (III). When the composition [composition having Polyester (III) and an amino resin] is used for a paint, or the like, it may further contain, if required, a dispersant, a wetting agent, an anti-settling agent, a segregation inhibitor, an anti-skinning agent, an antistatic agent, an antimould, a fire-retarding agent, and the like, each in an amount of 0.01 to 5 wt %. As an article to be coated, mention be made of metal, wood, plastic, inorganic material, concrete, asphalt, or the like. The above composition can be cured by drying under ordinary temperature or by drying under heating.

(3-1) Ester Acrylate(IV)

Ester acrylate (IV) of the present invention can be obtained by allowing Compound A [preferably the compound represented by the formula(A), where X is a hydrogen atom] or Polyester (III)(preferably, number-average molecular weight 100 to 5000) to react with acrylic acids or esters thereof, acryloyl chloride, or the like.

Examples of the acrylic acids include acrylic acids and methacrylic acids.

Examples of esters of the acrylic acids include methyl (meth)acrylate, ethyl (meth)acrylate, n-propyl (meth)acrylate, n-butyl (meth)acrylate, 2-ethylhexyl (meth)acrylate, lauryl (meth)acrylate, cyclohexyl (meth)acrylate, phenoxyethyl (meth)acrylate, 2-ethoxyethyl (meth)acrylate, 2-butoxyethyl (meth)acrylate, benzyl (meth)acrylate, and ethylcarbitol (meth)acrylate.

Examples of the acryloyl chloride include acrylic acid chloride and methacrylic acid chloride.

In the raw materials, the acrylic acids or esters thereof, acryloyl chlorides, or the like are preferably used in an amount of 0.9 to 10 equivalents (molar ratio) based on the amount of Compound A or Polyester (III), and the reaction temperature is preferably 0 to 70° C.

Ester acrylate (IV) of the present invention is cured by thermal polymerization (preferably, at 50 to 200° C.).

A composition having Ester acrylate (IV) and a radical photo-, or thermal polymerization initiator (which also be referred to hereinafter as Composition D) can be obtained by mixing Ester acrylate (IV) of the present invention with a radical photo-, or thermal polymerization initiator, and if required, the radical photopolymerizable monomers mentioned in the description of (2-1), and further, if required, other radical photopolymerizable polymers or oligomers, and the like. For the preparation of Composition D, the order of addition of these components, the mixing method thereof, and the like have no particular restriction.

The number-average molecular weight of Ester acrylate (IV) in Composition D is preferably 200 to 10000, and more preferably 500 to 5000.

As the radical photo-, or thermal polymerization initiators, mention be made of the same ones as those mentioned in the description of (2-1).

The content of the radical photo-, or thermal polymerization initiators is the same as the content in (2-1).

The curing conditions for Composition D are the same conditions as the curing conditions for Composition A in (2-1).

Ester acrylate (IV) of the present invention further contain, if required, conventional additives such as a cationic photopolymerizable polymer/oligomer/monomer, a cationic photoinitiator, a phenol type antioxidant, a sulfur-having antioxidant, a phosphorous-having antioxidant, an ultraviolet absorber, a hindered amine type photostabilizer, an antistatic agent, an inorganic colloid sol such as colloidal silica or colloidal alumina, a silane coupling agent, a coloring agent, a wax agent, an antiseptic agent, an anti-foaming agent, a plasticizer, a slipping agent, a catalyst, a viscosity modifier, a leveling agent, an anti-gelling agent, a filler, a solvent, a film-forming aid, a dispersant, a thickener, and a perfume. These additives be added during the production of Ester acrylate (IV).

As the phenol type antioxidants, the sulfur-having antioxidants, the phosphorus-having antioxidant, the ultraviolet absorbers, and the hindered amine type photostabilizers, mention be made of the same ones as those mentioned in the description of (2).

Composition D is cured through heating to 50 to 200° C. (when it contains a radical thermal polymerization initiator), or through irradiation with an infrared ray, a visible ray, an ultraviolet ray, an electron beam, $\alpha$, $\beta$, or $\gamma$ ray, or the like (when it contains a radical photopolymerization initiator).

Composition D is useful for applications such as a coating agent, a photoresist, or a solder resist.

The polyester obtained from polymerization of Ester acrylate (IV) contained in the cured product resulting from curing of Composition D is also included in the concept of the polyester of the present invention.

(4) Alkenyl Ether (V)

Alkenyl ether (V) of the present invention can be obtained by, for example, subjecting Compound A and an alkenyl ether monomer to an ether exchange reaction with a known method [Tetrahedron, 28, 233–238 (1972)], or a similar method thereto.

As the alkenyl ether monomers, mention be made of the same ones as those mentioned in the description of (1).

The ratio of the number of moles of the alkenyl ether monomer to the number of moles of the hydroxyl group in the raw materials is preferably 1 to 50.

A catalyst may be used, if required, during the production of Alkenyl ether (V) of the present invention, and a catalyst having palladium is preferred to.

As the catalyst containing palladium, mentioned are palladium chloride, palladium acetate, palladium nitrate, palladium oxide, and palladium complex, among which, a palladium complex is preferred. Examples of the palladium complex include bis(acetonitrile)dichloropalladium, bis(benzonitrile)dichloropalladium, diaceto(1,10-phenanthroline)palladium, diaceto(2,2'-bipyridine)palladium, diaceto(ethylenediamine)palladium, diaceto(2,4-pentanediamine)palladium, diaceto(1,2-cyclohexanediamine)palladium, dichloro(1,10-phenanthroline)palladium, dichloro(2,2'-bipyridine)palladium, dichloro(ethylenediamine)palladium, dichloro(2,4-pentanediamine)palladium, and dichloro(1,2-cyclohexanediamine)palladium. These palladium complexes also be the ones each formed in a reaction system by, for example, a palladium compound such as palladium chloride and a ligand such as 1,10-phenanthroline.

The amount of the catalyst having palladium to be added is preferably 0.0001 to 0.2 mole per mole of the alkenyl ether monomer.

The reaction may also be effected in the presence of a solvent. Examples of the solvent include aromatic hydrocarbons such as toluene and xylene, aliphatic hydrocarbons such as heptane, hexane, cyclohexane, and heptane, ethers such as diethyl ether and diisopropyl ether, ketones such as acetone and methyl ethyl ketone, hydrocarbon halides such as chloroform, methylene chloride, and dichloroethane, and polar solvents such as dimethyl formamide and dimethyl sulfoxide.

The reaction temperature is preferably −40 to 150° C.

A composition having Alkenyl ether (V) and a polymerization initiator generating an acid through heating or light irradiation (which also be referred to hereinafter as Composition E)can be obtained by mixing Alkenyl ether (V) with a polymerization initiator generating an acid through heating or light irradiation, and if required, the cationic photopolymerizable monomer mentioned in the description of (2-2), and further, if required, other cationic photopolymerizable polymers or oligomers,.and the like. For the preparation of Composition E, the order of addition of these components, the mixing method thereof, and the like have no particular restriction.

The number-average molecular weight of Alkenyl ether (V) for use in Composition E is preferably 200 to 10000, and more preferably.500 to 5000.

As the polymerization initiators generating an acid through heating or light irradiation, mention be made of the same ones as those mentioned in the description of (2-2).

The content of the polymerization initiator generating an acid through heating or light irradiation is the same as the content in (2-2).

The curing conditions for Composition E are the same conditions as the curing conditions for Composition B' in (2-2).

A composition having Alkenyl ether(V) and a compound having a male imido group (which also be referred to hereinafter as Composition F) can be obtained by moxing alkenyl ether (V) of the present invention and a compound having a maleimido group.

For the preparation of Composition F, the order of addition of these components, the mixing method thereof, and the like have no particular restriction.

The number-average molecular weight of Alkenyl ether (V) in Composition F is preferably 200 to 10000, and more preferably 500 to 5000.

As the compound having a maleimido group, mention be made of the same ones as those mentioned in the description of (2-2).

In Composition F, the ratio of the number of moles of the maleimido group to the number of moles of Alkenyl ether (V) is preferably 0.001 to 3.0, and more preferably 0.5 to 1.5.

Composition F is cured through irradiation with an infrared ray, a visible ray, an ultraviolet ray, an electron beam, α, β, or γ ray, or the like. In this step, Composition F may also be mixed with a radical photopolymerization initiator. Alternatively, composition F is cured by being mixed with a radical thermal polymerization initiator, and being heated to 50 to 200° C.

As the radical photopolymerization initiators and the radical thermal polymerization initiators, mention may be made of the same ones as those mentioned in the description of (2-1), respectively.

Alkenyl ether (V) of the present invention further contain, therein, if required, conventional additives such as a radical photopolymerizable polymer/oligomer/monomer, a radical photoinitiator, a phenol type antioxidant, a sulfur-having antioxidant, a phosphorous-having antioxidant, an ultraviolet absorber, a hindered amine type photostabilizer, an antistatic agent, an inorganic colloid sol such as colloidal silica or colloidal alumina, a silane coupling agent, a coloring agent, a wax agent, an antiseptic agent, an antifoaming agent, a plasticizer, a slipping agent, a catalyst, a viscosity modifier, a leveling agent, an anti-gelling agent, a filler, a solvent, a film-forming aid, a dispersant, a thickener, and a perfume. These additives may be added during the production of Alkenyl ether (V).

As the phenol type antioxidants, the sulfur-having antioxidants, the phosphorus-having antioxidant, the ultraviolet absorbers, and the hindered amine type photostabilizers, mention be made of the same ones as those mentioned in the description of (2).

Compositions E and F are useful for applications such as a coating agent, a photoresist, and a solder resist.

(5) Epoxy Resin, Epoxy Acrylate

An epoxy resin having a structural unit represented by formula (VII)

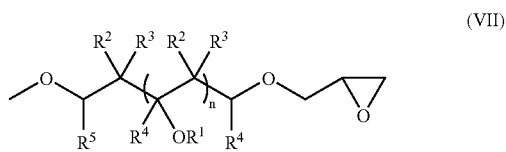

(wherein n, $R^1$, $R^2$, $R^3$, $R^4$ and $R^5$ respectively have the same meanings as defined above) can be obtained by allowing Compound A to react with epichlorohydrin by a known method. Hereinafter, the epoxy resin may also be referred to as Epoxy resin (VII).

A composition having Epoxy resin (VII) and a polymerization initiator generating an acid through heating or light irradiation (which also be referred to hereinafter as Composition G) can be obtained by mixing Epoxy resin (VII) is mixed with a polymerization initiator generating an acid through heating or light irradiation, and if required, the cationic photopolymerizable monomer mentioned in the description of (2-2), and further, if required, other cationic photopolymerizable polymers or oligomers, and the like. For the preparation of Composition G, the order of addition of these components, the mixing method thereof, and the like have no particular restriction.

The number-average molecular weight of Epoxy resin (VII) in Composition G is preferably 200 to 10000, and more preferably 500 to 5000.

As the polymerization initiators generating an acid through heating or light irradiation, mention be made of the same ones as those mentioned in the description of (2-2).

The content of the polymerization initiator generating an acid through heating or light irradiation is the same as the content in (2-2).

The curing conditions for Composition G are the same conditions as the curing conditions for Composition B in (2-2).

An epoxy acrylate having a structural unit represented by the formula (VIII):

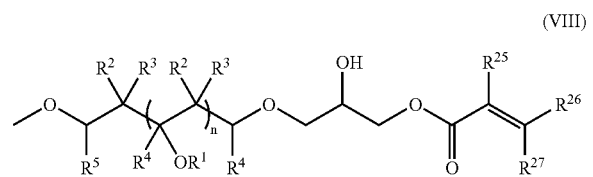

(VIII)

(wherein n, $R^1$, $R^2$, $R^3$, $R^4$ and $R^5$ respectively have the same meanings as defined above; and $R^{25}$, $R^{26}$, and $R^{27}$ are the same or different, and each represents a hydrogen atom, a substituted or unsubstituted lower alkyl, a substituted or unsubstituted cycloalkyl, a substituted or unsubstituted aryl, or a substituted or unsubstituted aralkyl) can be obtained by allowing Epoxy resin (VII) to react with acrylic acids in the presence of 2-ethyl imidazole, triethylbenzyl ammonium, and the like, preferably at 50 to 130° C. Herein, as the substituted or unsubstituted lower alkyl, the substituted or unsubstituted cycloalkyl, the substituted or unsubstituted aryl, and the substituted or unsubstituted aralkyl, mention be made of the same ones as those mentioned above.

Hereinafter, the epoxy acrylate having the structural unit represented by formula (VIII) may also be referred to as Epoxy acrylate (VIII).

As the acrylic acids, mention be made of the same ones as those mentioned in the description of (3-1).

In the raw materials, the amount of acrylic acids to be used is preferably 0.9 to 10 equivalents (molar ratio) based on the amount of Epoxy resin (VII), and the reaction temperature is preferably 0 to 70° C.

A composition having Epoxy acrylate (VIII) and a radical photo-, or thermal polymerization initiator (which also be referred to hereinafter as Composition H) can be obtained by mixing epoxy acrylate (VIII) is mixed with a radical photo-, or thermal polymerization initiator. For the preparation of Composition H, the order of addition of these components, the mixing method thereof, and the like have no particular restriction.

The number-average molecular weight of Epoxy acrylate (VIII) for use in Composition H is preferably 200 to 10000, and more preferably 500 to 5000.

As the radical photo-, or thermal polymerization initiator, mention be made of the same ones as those mentioned in the description of (2-1).

Epoxy acrylate (VIII) incorporate further contain, if required, conventional additives such as a cationic photopolymerizable polymer/oligomer/monomer, a cationic photoinitiator, a phenol type antioxidant, a sulfur-having antioxidant, a phosphorous-having antioxidant, an ultraviolet absorber, a hindered amine type photostabilizer, an antistatic agent, an inorganic colloid sol such as colloidal silica or colloidal alumina, a silane coupling agent, a coloring agent, a wax agent, an antiseptic agent, an anti-foaming agent, a plasticizer, a slipping agent, a catalyst, a viscosity modifier, a leveling agent, an anti-gelling agent, a filler, a solvent, a film-forming aid, a dispersant, a thickener, and a perfume. These additives may be added during the production of Epoxy acrylate (VIII).

As the phenol type antioxidants, the sulfur-having antioxidants, the phosphorus-having antioxidant, the ultraviolet absorbers, and the hindered amine type photostabilizers, mention be made of the same ones as those mentioned in the description of (2).

Composition H is cured through heating to 50 to 200° C. (when it contains a radical thermal polymerization initiator), or through irradiation with an infrared ray, a visible ray, an ultraviolet ray, an electron beam, α, β, or γ ray, or the like (when it contains a radical photopolymerization initiator).

Composition H is useful for applications such as a coating agent, a photoresist, and a solder resist.

BEST MODE FOR CARRYING OUT THE
PRESENT INVENTION

The present invention is described below in more detail by referring to Examples, Comparative Examples, and Reference Examples.

REFERENCE EXAMPLE 1

Polyethyl Vinyl Ether (a) having Hydroxyl Groups at its Both Ends (Compound A wherein $R^1$ is Ethyl, and $R^2$, $R^3$, $R^4$, $R^5$ and X are a Hydrogen Atom Into a 1-L flask made of glass, 28.9 g of ethyl orthoformate, 250 g of toluene and 0.13 g of boron trifluoride diethyl ether complex were added. While stirring this solution at 20° C., 361 g of ethyl vinyl ether was added. The addition of ethyl vinyl ether started polymerization. After completion of the addition, the reaction mixture was washed with a sodium hydroxide aqueous solution and distilled water. Then, the solvent was distilled off to obtain 370 g (yield 94.9%) of polyethyl vinyl ether having acetals at its both ends. Into a 2-L flask made of glass, 360 g of the resultant polyethyl vinyl ether having acetals at its both ends, 430 g of acetic acid, and 250 g of water were added, and stirred at 60° C. for 3 hours. The reaction mixture was neutralized with a saturated soda solution, and extracted with ethyl acetate. Then, ethyl acetate was distilled off to obtain 320 g of polyethyl vinyl ether having formyl groups at its both ends.

Into a 1-L autoclave made of SUS, 130 g of the resultant polyethyl vinyl ether having formyl groups at its both ends, 420 g of ethanol, and 19.5 g of Raney nickel were added, and hydrogen (1961 kPa) was introduced. The autoclave was heated to 80° C., and stirring was carried out for 4 hours. After the reaction, Raney nickel was filtered off, and then the solvent was distilled off to obtain 114 g of Polyethyl vinyl ether (a) having hydroxyl groups at its both ends.

The molecular characteristics of the resultant Polyethyl vinyl ether a having hydroxyl groups at its both ends are shown in Table 1. The number-average molecular weight of the polyethyl vinyl ether having hydroxyl groups at its both ends was measured by means of gel permeation chromatography (GPC).

(GPC Analysis Conditions)
Column: TSKgel SuperHM-L, TSKgel SuperHM-M, and TSKgel SuperHM-N (manufactured by TOSOH CORPORATION Ltd.) were connected in series.
Mobile phase: Tetrahydrofuran (Flow rate: 1 ml/min)
Column oven: 40° C.
Detector:RI[RI-8000 (manufactured by TOSOH CORPORATION Ltd.)]

TABLE 1

| Polyethyl vinyl ether having hydroxyl groups at its both ends | Hydroxyl value (mgKOH/g) | Water content (ppm) | Number-average molecular weight |
|---|---|---|---|
| (a) | 62.6 | 82 | 1,915 |

REFERENCE EXAMPLE 2

Polyisobutyl Vinyl Ether (b) having Hydroxyl Groups at its Both Ends (Compound A wherein $R^1$ is Isobutyl, and $R^2$, $R^3$, $R^4$ and $R^5$ are Each a Hydrogen Atom Into a 1-L flask made of glass, 25.3 g of ethyl orthoformate, 250 g of toluene, and 0.13 g of boron trifluoride diethyl ether complex were added. While stirring this solution at 20° C., 344 g of isobutyl vinyl ether was added. The addition of isobutyl vinyl ether started polymerization. After completion of the addition, the reaction mixture was washed with a sodium hydroxide aqueous solution and distilled water. Then, the solvent was distilled off to obtain 355 g of polyisobutyl vinyl ether having acetals at its both ends. Into a 2-L flask made of glass, 350 g of the resultant polyisobutyl vinyl ether having acetals at its both ends, 420 g of acetic acid, and 245 g of water were added, and stirred at 60° C. for 3 hours. The reaction mixture was neutralized with a saturated soda solution, and extracted with ethyl acetate. Then, ethyl acetate was distilled off to obtain 310 g of polyisobutyl vinyl ether having formyl groups at its both ends. Into a 1-L autoclave made of SUS, 130 g of the resultant polyisobutyl vinyl ether having formyl groups at its both ends, 420 g of ethanol, and 19.5 g of Raney nickel were added, and hydrogen (1961 kPa) was introduced. The autoclave was heated to 80° C., and stirring was carried out for 4 hours. After the reaction, Raney nickel was filtered off, and then the solvent was distilled off to obtain 111 g of Polyisobutyl vinyl ether (b) having hydroxyl groups at its both ends.

The molecular characteristics of the resultant Polyisobutyl vinyl ether (b) having hydroxyl groups at its both ends are shown in Table 2. The number-average molecular weight and the molecular weight distribution were measured under the same GPC measurement conditions as in Reference Example 1.

TABLE 2

| Polyisobutyl vinyl ether having hydroxyl groups at its both ends | Hydroxyl value (mgKOH/g) | Water content (ppm) | Number-average molecular weight | Molecular weight distribution Mw/Mn |
|---|---|---|---|---|
| (b) | 58.2 | 75 | 2,250 | 1.23 |

EXAMPLE 1

Production of Polyurethane

Polyurethane 1 was produced from the ingredients shown in Table 3 by a one-shot method (preheating temperature: 120° C., reaction time: 6 minutes, aging temperature: 80° C., aging time: 72 hours) using Polyethyl vinyl ether (a) obtained Reference Example 1 as polyethyl vinyl ether having hydroxyl groups at its both ends.

TABLE 3

| Polyurethane | Polyvinyl ether having hydroxyl groups at its both ends (g) | Diphenylmethane diisocyanate (g) | 1,4-Butanediol (g) |
|---|---|---|---|
| 1 | a: 72.2 | 19.3 | 3.5 |

The weight-average molecular weight of Polyurethane 1 is shown in Table 5. The weight-average molecular weight was measured by means of GPC. The GPC analysis conditions are the same as described above. The polyurethanes of the following examples were also measured for their weight-average molecular weight under the same GPC conditions.

EXAMPLES 2 AND 3

Production of Polyurethanes

Polyurethanes 2 and 3 were synthesized in the same manner as in Example 1, except that the ingredients for Polyurethanes 2 and 3 shown in Table 4.

TABLE 4

| Polyurethane | polyvinyl ether having hydroxyl groups at its both ends (g) | Diphenylmethane diisocyanate (g) | 1,4-Butanediol (g) |
|---|---|---|---|
| 2 | a: 86.9 | 49.7 | 13.4 |
| 3 | b: 76.1 | 20.2 | 3.6 |

Each weight-average molecular weight of Polyurethanes 2 and 3 is shown in Table 5.

TABLE 5

| Polyurethane | Weight-average molecular weight |
|---|---|
| 1 | 39,700 |
| 2 | 50,200 |
| 3 | 51,300 |

COMPARATIVE EXAMPLE 1

Production of Polyurethane

Polyurethane 4 was produced from the ingredients in Table 6 in the same manner as in Example 1 using polybutadiene polyol [manufactured by NIPPON SODA Co., Ltd, trade name: G-2000, hydroxyl value: 52.2 mgKOH/g, number-average molecular weight: 1900] as polybutadiene polyol. The polybutadiene polyol and 1,4-butanediol were not compatible with each other at 120° C., resulting in a whitely turbid condition.

TABLE 6

| Polyurethane | Polybutadiene polyol (g) | Diphenylmethane diisocyanate (g) | 1,4-Butanediol (g) |
|---|---|---|---|
| 4 | 110.4 | 52.1 | 14.1 |

The weight-average molecular weight of the resultant Polyurethane 4 is shown in Table 7.

TABLE 7

| Polyurethane | Weight-average molecular weight |
|---|---|
| 4 | 98,000 |

TEST EXAMPLE 1

Mechanical Strength, Transparency, and Solvent Solubility

By the use of the polyurethanes (Polyurethanes 1 to 4) produced in Examples 1 to 3 and Comparative Example 1, films with a thickness of 300 micron were formed by press forming under the following conditions. The mechanical strength of each resultant film was measured in the following manner. Preheating conditions: Preheating was carried out in a mould at 160° C. (Polyurethane 1), 180° C. (Polyurethane 2), 80° C. (Polyurethane 3), or 180° C. (Polyurethane 4) for 5 minutes. Hot press conditions: Pressurization was carried out at 160° c. (Polyurethane 1), 180° C. (Polyurethane 2), 80° C. (Polyurethane 3), or 180° C. (Polyurethane 4) at 14710 kPa, for 120 seconds, and at 2942 kPa for 30 seconds, and subsequently, pressurization was carried out at 20° C. at 6864 kPa for 120 seconds.

A tensile test was carried out at 23° C. according to JIS K-7311 for each aforesaid polyurethane film.

The measurement results thereof, the outward appearances of the films, and the solubilities in THF (tetrahydrofuran) are shown in Table 8.

TABLE 8

| polyurethane | Hardness (JIS A) | 100% Modulus (MPa) | Tensile strength (MPa) | Tensile strength at break (MPa) | Elongation at break (%) | Transparency | THF Solubility |
|---|---|---|---|---|---|---|---|
| 1 | 65 | 1.6 | 2.9 | 1.4 | 1500 | ○ | ○ |
| 2 | 84 | 8.3 | 9.5 | 9.3 | 230 | Δ to ○ | ○ |
| 3 | 66 | 1.7 | 2.7 |  | 1600 | Δ to ○ | ○ |
| 4 | 52 | 0.9 | 1.1 | 0.7 | 460 | X | X |

Meanings of the evaluations as to the transparency and the THF solubility (0.2 g of the sample was dissolved in 99.8 g of THF) in Table 8 were as follows.

Transparency: ○ Transparent, Δ A little turbid, X Not transparent THF solubility: ○ No insoluble matter observed, X Insoluble matter observed.

Polyurethane 1 to 3 of the present invention each showed excellent tensile strength at break, transparency, and solvent solubility as compared with Polyurethane 4.

EXAMPLE 4

Production of Urethane Acrylate

Into a 1-L flask made of glass, 358.4 g of diethylene glycol monoethyl ether acetate, 383 g (0.2 mol) of Polyethyl vinyl ether a having hydroxyl groups at its both ends obtained in Reference Example 1 and 104.8 g (0.4 mol) of 4,4'-diisocyanate dicyclohexylmethane were charged. The mixture was heated up to 70° C. with stirring under a nitrogen flow atmosphere, and the reaction was continued for 2 hours with the temperature kept at 70° C. The reaction mixture was once cooled down to room temperature, and 46.4 g (0.4 mol) of 2-hydroxyethylacrylate was added thereto. The mixture was heated to 80° C., and allowed to react for 2 hours. The IR spectrum of the reaction product was measured. As a result, the absorption of an isocyanate group was not detected. The solid content of the reaction product was 59 wt %.

EXAMPLE 5

Production of Polyurethane

Polyurethane 5 was produced from the ingredients shown in Table 9 in the same manner as in Example 1. As the polyoxypropylene glycol, polyoxypropylene glycol [manufactured by SANYO CHEMICAL INDUSTRIES, Ltd., trade name: PP-2000, hydroxyl value: 55.5 mgKOH/g, number-average molecular weight: 2000] was used, and as Polyethyl vinyl ether having hydroxyl groups at its both ends, polyethylvinyl ether (a) obtained in Reference Example 1 was used.

TABLE 9

| Polyurethane | Polyoxypropylene glycol (g) | Polyvinyl ether having hydroxyl groups at its both ends (g) | Diphenylmethane diisocyanate (g) | 1,4-Butanediol (g) |
|---|---|---|---|---|
| 5 | 66.4 | a: 28.5 | 49.7 | 13.4 |

The weight-average molecular weight of the resultant Polyurethane 5 is shown in Table 10.

TABLE 10

| Polyurethane | Weight-average molecular weight |
|---|---|
| 5 | 128,000 |

COMPARATIVE EXAMPLE 2

Production of Polyurethane

Polyurethane 6 was produced from the ingredients shown in Table 11 in the same manner as in Example 1 using by polyoxypropylene glycol [manufactured by SANYO CHEMICAL. INDUSTRIES, Ltd., trade name: PP-2000, hydroxyl value: 55.5 mgKOH/g, number-average molecular weight: 2000] as polyoxypropylene glycol.

TABLE 11

| Poly-urethane | Polyoxypropylene glycol (g) | Diphenylmethane diisocyanate (g) | 1,4-Butanediol (g) |
|---|---|---|---|
| 6 | 122.5 | 61.0 | 16.5 |

The weight-average molecular weight of the resultant Polyurethane 6 is shown in Table 12.

TABLE 12

| polyurethane | Weight-average molecular weight |
|---|---|
| 6 | 121,000 |

COMPARATIVE EXAMPLE 3

Production of Polyurethane

Polyurethane 7 was produced from the ingredients shown in Table 13 in the same manner as in Example 1 using polyester polyol comprising 1,4-butanediol and adipic acid [manufactured by ASAHI DENKA Co., Ltd., trade name: F9-30, Hydroxyl value: 55.3 mgKOH/g, number-average molecular weight: 2000] as the polyester polyol.

TABLE 13

| Poly-urethane | Polyester polyol (g) | Diphenylmethane diisocyanate (g) | 1,4-butanediol (g) |
|---|---|---|---|
| 7 | 122.8 | 60.5 | 16.7 |

The weight-average molecular weight of the resultant Polyurethane 7 is shown in Table 14.

TABLE 14

| Polyurethane | Weight-average molecular weight |
|---|---|
| 7 | 93,000 |

TEST EXAMPLE 2

Water Resistance

The water resistances of Polyurethanes 1 to 3, and 5 to 7 obtained in the foregoing manner were evaluated in the following manner.

Each polyurethane film obtained in the same manner as in Test Example 1 was dipped in 100° C. water, and the changes with the elaspe of time in retention of the weight-average molecular weight were measured. The weight-average molecular weight was measured in the same manner as in Example 1. The measurement results are shown in Table 15.

TABLE 15

| Poly-urethane | Weight-average molecular weight retention (%) | |
| | After 7 days | After 14 days |
|---|---|---|
| 1 | 86 | 82 |
| 2 | 79 | 82 |
| 3 | 90 | 85 |
| 5 | 75 | 60 |
| 6 | 34 | 26 |
| 7 | 23 | 7 |

Polyurethanes 1 to 3, and 5 of the present invention showed excellent water resistances as compared with Polyurethanes 6 and 7.

TEST EXAMPLE 3

Thermal Aging Resistance

The thermal aging resistances of Polyurethanes 1 to 3, and 5 and 6, obtained in the foregoing manner were evaluated in the following manner.

Each polyurethane film obtained in the same manner as in Test Example 1 was placed in a 125° C. oven, and the changes with elaspe of time in retention of the weight-average molecular weight were measured. The weight-average molecular weight was measured in the same manner as with Example 1. The measurement results are shown in Table 16.

TABLE 16

| Polyurethane | Weight-average molecular weight retention (%) after 7 days |
|---|---|
| 1 | 108 |
| 2 | 103 |
| 3 | 111 |
| 5 | 108 |
| 6 | 67 |

Polyurethanes 1 to 3, and 5 of the present invention showed excellent thermal aging resistances as compared with Polyurethane 6.

TEST EXAMPLE 4

Electric Characteristics

The electric characteristics of Polyurethanes 2, 3, 6, and 7 obtained in the foregoing manner were evaluated in the following manner.

Each polyurethane film obtained in the same manner as in Test Example 1 was measured for the volume resistivity according to JIS K6911. The measurement results are shown in Table 17.

TABLE 17

| Polyurethane | Volume resistivity (Ωcm) |
| --- | --- |
| 2 | $3.7 \times 10^{15}$ |
| 3 | $8.1 \times 10^{15}$ |
| 6 | $1.0 \times 10^{13}$ |
| 7 | $4.9 \times 10^{14}$ |

Polyurethanes 2 and 3 of the present invention showed excellent electrical insulation properties as compared with Polyurethanes 6 and 7.

EXAMPLE 6

Production of Aqueous Polyurethane Resin

Into a 1-L flask made of glass, 153 g (0.08 mol) of Polyethyl vinyl ether (a) having hyroxyl groups at its both ends obtained in Reference Example 1 and 16.9 g (0.11 mol) of dimethylol butanoic acid (DMBA) were charged, and heated to 80° C. with stirring under a nitrogen atmosphere. While supplying nitrogen into the flask, and simultaneously carrying out evacuation using a vacuum pump, stirring was further continued for 30 minutes. After stopping the evacuation by the vacuum pump, the temperature in the flask was cooled to 60° C., and 60 g of acetone was added thereto. After increasing the temperature to 80° C. again, 117.8 g (0.53 mol) of isophorone diisocyanate (IPDI) was added dropwise over 1 hour. After the completion of dropwise addition, stirring was continued with the temperature in the flask kept at 80° C. until the reaction rate of isocyanate groups in the reaction solution became 95% or more. Thereafter, the reaction product was cooled down to 60° C., and 11.6 g (0.11 mol) of triethylamine was added thereto to neutralize the carboxyl group in the urethane prepolymer, thereby obtain a urethane prepolymer.

To the resulting urethane prepolymer, 480 g of distilled water was added gradually with stirring by a homomixer at 3000 to 4000 rpm to obtain an aqueous dispersion of an urethane prepolymer. While continuing the stirring by the homomixer, 19.9 g (0.33 mol) of ethylenediamine (EDA) was added to the aqueous dispersion to obtain an objective Aqueous polyurethane resin 1.

EXAMPLE 7

Production of Aqueous Polyurethane Resin

Aqueous polyurethane resin 2 was obtained in the same manner in with Example 6, except that 180 g (0.08 mol) of, Polyisobutyl vinyl ether (b) having hydroxyl groups at its both ends obtained in Reference Example 2 was used in place of Polyethyl vinyl ether (a) having hydroxyl groups at its both ends obtained in Reference Example 1.

COMPARATIVE EXAMPLE 4

Production of Aqueous Polyurethane Resin

Aqueous polyurethane resin 3 was obtained in the same manner as in Example 6, except that 161 g (0.08 mol) of polyoxypropylene glycol [manufactured by SANYO CHEMICAL INDUSTRIES, Ltd., trade name: PP-2000, hydroxyl value: 55.5 mgKOH/g, number-average molecular weight: 2000] was used in place of Polyethyl vinyl ether (a) having hydroxyl groups at its both ends obtained in Reference Example 1.

COMPARATIVE EXAMPLE 5

Production of Aqueous Polyurethane Resin

Aqueous polyurethane resin 4 was obtained in the same manner as in Example 6, except that 162 g (0.08 mol) of polyester polyol comprising 1,4-butanediol and adipic acid [manufactured by ASAHI DENKA Co., Ltd., trade name: F9-30, hydroxyl value: 55.3 mgKOH/g, number-average molecular weight: 2000] was used in place of Polyethyl vinyl ether (a) having hydroxyl groups at its both ends obtained in Reference Example 1.

TEST EXAMPLE 5

Water Resistance

The water resistance of each film obtainable from Aqueous polyurethane resins 1 to 4 obtained in the foregoing manner was evaluated in the following manner.

Each polyurethane film obtained in the same manner as in Test Example 1 was dipped in 100° C. water for 7 days, and the weight-average molecular weight was measured. The retention of the weight-average molecular weight (weight-average molecular weight after test/before test×100) was determined from the measurement result. The results of the retention are shown in Table 18.

TABLE 18

| Aqueous polyurethane resin | Weight-average molecular weight retention (%) |
| --- | --- |
| 1 | 75 |
| 2 | 86 |
| 3 | 31 |
| 4 | 18 |

Aqueous polyurathane resins 1 and 2 of the present invention showed excellent water resistances as compared with Aqueous polyurethane resins 3 and 4.

EXAMPLE 8

Production of Urethane Acrylate

A urathane acrylate was obtained in the same manner as in Example 4, except that 450 g (0.2 mol) of Polyisobutyl vinyl ether (b) having hydroxyl groups at its both ends obtained in Reference Example 2 was used in place of Polyethyl vinyl ether (a) having hydroxyl groups at its both ends obtained in Reference Example 1.

COMPARATIVE EXAMPLE 6

Production of Urethane Acrylate

A urethane acrylate was obtained in the same manner as in Example 4, except 404 g (0.2 mol) of polyoxypropylene glycol [manufactured by SANYO CHEMICAL INDUSTRIES, Ltd., trade name: PP-2000, hydroxyl value: 55.5 mgKOH/g, number-average molecular weight:2000]was used in place of Polyethyl vinyl ether (a) having hydroxyl groups at its both ends obtained in Reference Example 1.

COMPARATIVE EXAMPLE 7

Production of Urethane Acrylate

A urethane acrylate was obtained in the same manner as in Example 4, except that 406 g (0.2 mol) of polyester polyol comprising 1,4-butanediol and adipic acid [manufactured by ASAHI DENKA Co., Ltd., trade name: F9-30, hydroxyl value: 55.3 mgKOH/g, number-average molecular weight: 2000] was used in place of Polyethyl vinyl ether (a) having hydroxyl groups at its both ends obtained in Reference Example 1.

TEST EXAMPLE 6

Mechanical Strength, Water Resistance, and Adhesion

Into each 60 wt % THF solution of the urethane acrylates obtained in Examples 4 and 8, and Comparative Examples 6 and 7, 2.0 parts by weight of IRGACURE184 (manufactured by Ciba Speciality Chemicals), 0.5 parts by weight of IRGACURE 819 (manufactured by Ciba Speciality Chemicals), and 0.3 parts by weight of IRGANOX 1035 (manufactured by Ciba Speciality Chemicals) were dissolved per 100 parts by weight of the urethane acrylate. Subsequently, the resulting mixture was applied onto a glass panel by means of a 0.27-mm applicator. The coated panel was subjected to vacuum drying overnight in a 60° C. oven, and then dried overnight at 23° C./humidity 50%. Thereafter, curing was carried out under the following conditions:

Curing apparatus: UV curing apparatus manufactured by EYE GRAPHICS Co., Ltd.
Lamp: Metal halide lamp (optical path length 25 cm) and high pressure mercury lamp (optical path length 25 cm)
Intensity: 80 W/cm
Conveyor speed: 4.6 m/min
Irradiation distance: 50 cm The mechanical strength and the water resistance of the resulting cured film were evaluated. The mechanical strength was evaluated by a tensile test, and the water resistance was evaluated based on the changes with the elapse of time in retention of the Tensile strength (Tensile strength after test/before test×100) in the tensile test, during which the cured film was dipped in 100° C. water for 7 days or 14 days. The tensile test was carried out according to JIS K-7113.

The 60 wt % THF solution of the urethane acrylate obtained in Example 4 was applied onto standard test panels ABS (acrylonitrile butadiene styrene), PS (polystyrene), and PC (polycarbonate) manufactured by Nippon. Test panel Osaka Co., Ltd., and dried and cured under the same conditions as described above. The adhesion of each resulting film was evaluated using the following test method.

Adhesion testing method: the cross-cut tape method defined according to JIS K5400 was carried out. Cuts in a grid were incised at an interval of 1 mm through the film, and then the film was peeled off with a cellophane tape. The results are referred to in terms of the number of squares remaining without having been peeled off out of 100 squares as the evaluation score.

The foregoing measurement results are shown in Tables 19 and 19-2.

TABLE 19

| Urethane acrylate | Tension modulus (MPa) | Retention of tensile strength (%) | |
|---|---|---|---|
| | | After 7 days | After 14 days |
| Example 4 | 2.3 | 86 | 83 |
| Example 8 | 2.0 | 90 | 87 |
| Comparative Example 6 | 4.6 | 45 | 38 |
| Comparative Example 7 | 5.1 | 36 | 20 |

TABLE 19-2

| Standard test panel | Adhesion |
|---|---|
| ABS | 93/100 |
| PS | 98/100 |
| PC | 97/100 |

Each cured product obtainable by curing the urethane acrylates obtained in Examples 4 and 8 showed excellent mechanical strength and water, resistance as compared with the cured products obtainable by curing the urethane acrylates obtained in Comparative Examples 6 and 7.

The cured product obtainable by curing the urethane acrylate obtained in Example 4 showed excellent adhesion to the ABS, PS, and PC standard test panels.

EXAMPLE 9

Production of Urethane Alkenyl Ether

Into a 500-mL flask made of glass, 43.0 g (0.25 mol) of 2,4-tolylene diisocyanate, 287.3 g (0.15 mol) of the polyethyl vinyl ether (a) having hydroxyl groups at its both ends obtained in Reference Example 1 and 0.23 g (0.36 mol) of di-n-butyltin dilaurate were charged. The mixture was heated up to 80° C. with stirring under a nitrogen flow atmosphere, and allowed to react for 1 hour. The reaction mixture was once cooled down to 60° C., and 18.5 g (0.2 mol) of 2-hydroxyethyl vinyl ether was added thereto. The mixture was allowed to react at 70° C. for one hour. The IR spectrum of the reaction product was measured. As a result, the absorption of an isocyanate group was not detected.

EXAMPLE 10

Production of Urethane Alkenyl Ether

An urethane alkenyl ether was obtained in the same manner as in Example 9, except that 337.5 g (0.15 mol) of Polyisobutyl vinyl ether (b) having hydroxyl groups at its both ends obtained in Reference Example 2 was used in place of Polyethyl vinyl ether (a) having hydroxyl groups at its both ends obtained in Reference Example 1.

COMPARATIVE EXAMPLE 8

Production of Urethane Alkenyl Ether

An urethane alkenyl ether was obtained in the same manner as in Example 9, except that 303 g (0.15 mol) of polyoxypropylene glycol [manufactured by SANYO CHEMICAL INDUSTRIES, Ltd., trade name: PP-2000, hydroxyl value: 55.5 mgKOH/g, number-average molecular weight: 2000] was used in place of Polyethyl vinyl ether (a) having hydroxyl groups at its both ends obtained in Reference Example 1.

TEST EXAMPLE 7

Mechanical Strength, Water Resistance, and the Like

Each urethane alkenyl ether obtained in Examples 9 and 10, and Comparative Example 8 was cured under the following conditions, and the mechanical strength of the resultant film was measured.

A THF solution (solid content 60%) of the urethane alkenyl ether was prepared, to which 2.5 parts by weight of OPTOMER SP-170 (manufactured by ASAHI DENKA Co., Ltd.) was dissolved per 100 parts by weight of the urethane alkenyl ether. Then, the solution was applied onto a glass panel by means of a 0.254-mm applicator. The coated panel was subjected to vacuum drying overnight in a 60° C. oven, and irradiated with an ultraviolet ray until the film was cured under the following conditions.

Curing apparatus: UV curing apparatus manufactured by EYE GRAPHICS Co., Ltd.
Lamp: Metal halide lamp (optical path length 25 cm) and high pressure mercury lamp (optical path length 25 cm)
Intensity: 160 W/cm
Conveyor speed: 4.6 m/min
Irradiation distance: 20 cm Each resultant 50-μm cured film was subjected to a tensile test at 23° C. according to JIS K-7113. The resultant cured film was held for 7 days and for 14 days in a 90° C./humidity 95% constant-temperature constant-humidity vessel. Then, the changes with the elapse of time in retention of Tensile strength were measured to evaluate the moist heat resistance (weather resistance and water resistance).

The foregoing measurement results are shown in Tables 20 and 20-2.

TABLE 20

| Urethane alkenyl ether | 100% Modulus (MPa) | Tensile strength (MPa) | Tensile strength at break (MPa) | Elongation at break (%) | Tension modulus (MPa) |
|---|---|---|---|---|---|
| Example 9 | 1.1 | 1.9 | 1.9 | 110 | 2.0 |
| Example 10 | 1.1 | 1.8 | 1.8 | 120 | 1.9 |
| Comparative Example 8 | 2.3 | 2.9 | 2.9 | 170 | 3.4 |

TABLE 20-2

| | Retention of tensile strength (%) | |
|---|---|---|
| Urethane alkenyl ether | After 7 days | After 14 days |
| Example 9 | 93 | 90 |
| Example 10 | 95 | 89 |
| Comparative Example 8 | 52 | 45 |

Each cured product obtainable by curing the urethane acrylates obtained in Examples 9 and 10 was low in modulus of elasticity and flexible, and in addition, showed excellent moist heat resistance (weather resistance and water resistance) as compared with the cured product obtainable by curing the urethane alkenyl ether obtained in Comparative Example 8.

EXAMPLE 11

Curing of Composition having Urethane Alkenyl Ether and a Compound having a Maleimido Group The urethane alkenyl ether obtained in Example 9 and 4,4'-bismaleimide diphenylmethane were mixed so that the ratio of the number of moles of the maleimido group to the number of moles of the urethane alkenyl ether became 1.0. Then, 2.0 parts by weight of IRGACURE 184 (manufactured by Ciba Speciality Chemicals) and 0.5 parts by weight of IRGACURE 819 (manufactured by Ciba Speciality Chemicals) were added per 100 parts by weight of the mixture. Then, THF was added thereto to prepare a 40 wt % solution. The resulting mixture was applied onto a glass panel by means of a 0.254-mm applicator. The coated panel was subjected to vacuum drying in a 60° C. oven overnight, and then irradiated with an ultraviolet ray under the same conditions as in Test Example 7, resulting in a cured coating.

COMPARATIVE EXAMPLE 9

Curing of Composition having Urethane Alkenyl Ether and a Compound having a Maleimido Group A cured coating was obtained in the same manner as in Example 11, except that the urethane alkenyl ether obtained in Comparative Example 8 was used in place of the urethane alkenyl ether obtained in Example 9.

TEST EXAMPLE 8

Water Resistance

The water resistance was evaluated by the use of each cured coating obtained in, Example 11 and Comparative Example 9. The water resistance test was carried out in the same manner as with Test Example 7.

The measurement results are shown in Table 21.

TABLE 21

| | Retention of tensile strength (%) | |
|---|---|---|
| Cured coating | After 7 days | After 14 days |
| Example 11 | 97 | 93 |
| Comparative Example 9 | 68 | 57 |

The cured coating obtained in Example 11 showed excellent water resistance as compared with the cured coating obtained in Comparative Example 9.

EXAMPLE 12

Production of Polyurethane (Coating)

Into a glass bottle, 10.04 g of ACRYDICA-801 (solid content 50%, which also be abbreviated hereinafter as A-801, manufactured by Dainippon Ink & Chemicals, Inc.) as is an acryl polyol, 0.255 g of Polyethyl vinyl ether (a) having hydroxyl groups at its both ends obtained in Reference Example 1 (which also be abbreviated hereinafter as (a), 0.855 g of SUMIDURN-3300 (which also be abbreviated hereinafter as N-3300,manufactured by Sumika Bayer Urethane Co., Ltd.) which is the isocyanurate form of hexamethylene diisocyanate, 6.35 g of xylene (which be abbreviated hereinafter as XY), and 0.002 g of dibutyltin dilaurate (which also be abbreviated hereinafter as DBTDL) were charged, and stirred at room temperature for 2 minutes. The acryl urethane paint thus produced was applied onto a zinc phosphated steel panel by means of an applicator. The panel was allowed to stand for 10 minutes, and then, dried at 80° C. for 20 minutes, and allowed to stand overnight at 23° C./humidity 50%. As a result, a polyurethane (coating) with a thickness of about 20 μm was obtained.

EXAMPLE 13

Production of Polyurethane (Coating)

A polyurethane (coating) was obtained by the same operation as in Example 12, except that the raw material composition was changed to that shown in Table 22.

COMPARATIVE EXAMPLES 10 TO 12

Production of Polyurethane (Coating)

Each polyurethane (coating) was obtained by the same operation as in Example 12, except that the raw material composition was changed to that shown in Table 22. PTG2000 in Table 22 means polytetramethylene ether glycol (number-average molecular weight=2000).

TEST EXAMPLE 9

Solvent Resistance, Impact Resistance, Pencil Hardness, and Adhesion

Each polyurethane (coating) obtained in Examples 12 and 13, and Comparative Examples 10 to 12 were tested for the solvent resistance, the impact resistance, the pencil hardness, and the adhesion. The adhesion, the pencil hardness, the impact resistance, and the solvent resistance were evaluated in the following manner.

Adhesion: the test was carried out in the same manner as in the adhesion testing method described in Test. Example 6.
Pencil hardness: the pencil scratch test defined in JIS K5400 was carried out, so that the evaluation of the coating according to the scratch was carried out. The results are referred to as the highest hardness of a pencil which will not give scratches thereon even when it scratches the coating.

Impact resistance: the Dupont type impact resistance test (½ inch) defined in JIS K5400 was carried out, so that the evaluation of the coating according to the crack and the peeling was carried out. A 1000-g weight was used. The results are referred to as the maximum drop height of the weight which will not cause cracks or peeling even when it gives an impact thereon.

Solvent resistance: the coating was rubbed under a load of 500 g with a gauze dipped in methyl ethyl ketone (MEK) (rubbing was carried out). The results are referred to as the ranks (⊚: 100 times or more, ○: 50 time or more and less than 100 times, X: less than 50 times) according to the number of reciprocating rubbing cycles until the steel panel surface is exposed.

The foregoing test results are shown in Table 22.

Although each polyurethane (coating) obtained in Examples 12 and 13 of the present invention was equal in solvent resistance, pencil hardness, and adhesion to that not having Polyethyl vinyl ether a having hydroxyl groups at its both ends obtained in Reference Example 1, it showed excellent impact resistance.

EXAMPLE 14

Production of Polyurethane (Coating)

Into a glass bottle, 10.0 g of Polyethyl vinyl ether (a) having hydroxyl groups at its both ends obtained in Reference Example 1 (which also be abbreviated hereinafter as (a), 2.54 g of SUMIDUR N-3300 (which also be abbreviated hereinafter as N-3300, manufactured by Sumika Bayer Urethane Co., Ltd.) which is the isocyanurate form of hexamethylene diisocyanate, 23.3 g of xylene (which also be abbreviated hereinafter as XY), and 0.003 g of dibutyltin dilaurate (which also be abbreviated hereinafter as DBTDL) were charged, and stirred at room temperature for 2 minutes. The acryl urethane paint thus produced was applied onto the standard test panels PS (polystyrene), aluminum, and glass panels manufactured by Nippon Test panel Osaka Co., Ltd., with an applicator. Each panel was allowed to stand for 10 minutes, and then, dried at 80° C. for 20 minutes, and allowed to stand overnight at 23° C./humidity 50%. As a result, a polyurethane (coating) with a thickness of about 20 μm was obtained.

EXAMPLE 15

Production of Polyurethane (Coating)

A polyurethane (coating) was obtained by the same operation as in Example 14, except that the raw material composition was changed to that shown in Table 23. In Table 23, PTG2000 means polytetramethylene ether glycol [manufactured by HODOGAYA CHEMICAL Co., Ltd., trade name: PTG-2000SN, hydroxyl value: 56.3 mgKOH/g, number-average molecular weight: 2000], and G2000 means polybutadiene polyol [manufactured by NIPPON SODA Co., Ltd., trade name: G-2000, hydroxyl value: 52.2 mgKOH/g, number-average molecular weight: 1900].

COMPARATIVE EXAMPLES 13 TO 16

Production of Polyurethane (Coating)

A polyurethane (coating) was obtained by the same operation as in Example 14, except that the raw material compo-

TABLE 22

| Polyurethane (Coating) | Raw material composition (g) | | | | | | Solvent resistance | Impact resistance (cm) | Pencil hardness | Adhesion |
|---|---|---|---|---|---|---|---|---|---|---|
| | A-801 | a | PTG2000 | N-3300 | DBTDL | XY | | | | |
| Example 12 | 10.04 | 0.255 | | 0.857 | 0.0018 | 6.34 | ⊚ | 30 | F | 100/100 |
| Example 13 | 10.02 | 0.507 | | 0.852 | 0.0020 | 6.81 | ⊚ | 45 | F | 100/100 |
| Comparative Example 10 | 10.01 | | 0.252 | 0.862 | 0.0021 | 6.36 | ⊚ | 25 | F | 100/100 |
| Comparative Example 11 | 10.01 | | 0.504 | 0.865 | 0.0017 | 6.83 | ⊚ | 35 | HB | 100/100 |
| Comparative Example 12 | 10.04 | | | 0.857 | 0.0021 | 5.89 | ⊚ | 15 | F | 100/100 | sition was changed to that shown in Table 23. In Table 23, A-801 means ACRYDIC A801 which is an acryl polyol (solid content 50%, which also be hereinafter abbreviated as A-801, manufactured by Dainippon Ink & Chemicals, Inc., hydroxyl value 50.0 mgKOH/g, number-average molecular weight: 2200), and F9-30 maens polyester polyol comprising 1,4-butanediol and adipic acid [manufactured by ASAHI DENKA Co., Ltd., trade name: F9-30, Hydroxyl value: 55.3 mgKOH/g, number-average molecular weight: 2000].

TEST EXAMPLE 10

Adhesion

An adhesion test was carried out by the use of each polyurethane (coating) obtained in Examples 14 and 15, and Comparative Examples 13 to 16. The adhesion test was carried out in the same manner as with the adhesion testing method described in Test Example 6. As base materials, standard test panels PS (polystyrene) and aluminum manufactured by Nippon Test panel Osaka Co., Ltd., were used.

The foregoing test results are shown in Table 23-2.

TABLE 23

| Polyurethane (Coating) | Raw material composition (g) | | | | | | | |
|---|---|---|---|---|---|---|---|---|
| | a | PTG2000 | G2000 | A-801 | F9-30 | N-3300 | DBTDL | XY |
| Example 14 | 10.0 | | | | | 2.54 | 0.003 | 23.3 |
| Example 15 | 3.0 | | 7.0 | | | 2.01 | 0.003 | 22.3 |
| Comparative Example 13 | | 10.0 | | | | 1.93 | 0.003 | 22.2 |
| Comparative Example 14 | | | 10.0 | | | 1.79 | 0.003 | 21.9 |
| Comparative Example 15 | | | | 20.0 | | 1.71 | 0.003 | 11.7 |
| Comparative Example 16 | | | | | 10.0 | 1.89 | 0.003 | 22.1 |

TABLE 23-2

| | Adhesion | |
|---|---|---|
| polyurethane (Coating) | Polystyrene | Aluminum |
| Example 14 | 100/100 | 100/100 |
| Example 15 | 100/100 | 100/100 |
| Comparative Example 13 | 100/100 | 0/100 |
| Comparative Example 14 | 98/100 | 37/100 |
| Comparative Example 15 | 7/100 | 100/100 |
| Comparative Example 16 | 0/100 | 13/100 |

Each polyurethane (coating) obtained in Examples 14 and 15 of the present invention showed excellent adhesion as compared with the polyurethane (coatings) obtained in Comparative Examples 13 to 16.

EXAMPLE 16

Production of Polyurethane (Urethane Resin for Ink)

Into a 200-mL flask made of glass, 72.9 g (0.04 mol) of Polyethyl vinyl ether (a) having hydroxyl groups at-its both ends obtained in Reference Example 1, 1.7 g (0.02 mol) of 1,4-butanediol and 22.3 g (0.1 mol) of isophorone diisocyanate were charged, and the mixture was heated to 100° C. with stirring under a nitrogen atmosphere, and allowed to react for 9 hours. Then, 40 mL of toluene and 40 mL of methyl ethyl ketone were added thereto, and the mixture was cooled down to room temperature to obtain an urethane prepolymer. Into a 500-mL flask made of glass, 52 mL of toluene, 52 mL of methyl ethyl ketone, 96 mL of 2-propanol, 8.5 g (0.05 mol) of isophoronediamine, and 0.65 g (0.005 mol) of dibutylamine were charged, and the resultant urethane prepolymer obtained above was added thereto with stirring at room temperature. This solution was heated to 50° C., and allowed to react for 4 hours to obtain an objective polyurethane. The resultant polyurethane had a weight-average molecular weight of 9,000, and a solid content of 32 wt %.

COMPARATIVE EXAMPLE 17

Production of Polyurethane (Urethane Resin for Ink)

A polyurethane was obtained in the same manner as in Example 16, except that 77.6 g (0.04 mol) of poly(3-methyl-1,5-pentane adipate)diol [KURAPOL P2010, manufactured by Kuraray, Co., Ltd., hydroxyl value: 57.8 mgKOH/g, number-average molecular weight: 1940] was used in place of Polyethyl vinyl ether (a) having hydroxyl groups at its both ends obtained in Reference Example 1. The resulting polyurethane had a weight-average molecular weight of 13,000 and a solid content of 34 wt %.

TEST EXAMPLE 11

Adhesion

Each polyurethane obtained in Example 16, and Comparative Example 17 was applied onto standard test panels PS (polystyrene), FRP (glass fiber reinforced plastic), aluminum, zinc phosphated steel panel, PP[polypropylene, corona discharge treatment, wetting index: 40 mN/m (JIS K6768)], and glass with an applicator. The coated panels were dried at 80° C. for 30 minutes to thereby obtain coatings each having a thickness of about 30 μm. A test of adhesion was carried out using each resulting coating in the same manner as in Test Example 6. The test results are shown in Table 24.

TABLE 24

| | Adhesion | |
|---|---|---|
| Standard test panel | Example 16 | Comparative Example 17 |
| PS | 100/100 | 45/100 |
| FRP | 95/100 | 25/100 |
| Aluminum | 100/100 | 72/100 |
| Zinc phosphated steel panel | 100/100 | 26/100 |

TABLE 24-continued

| | Adhesion | |
|---|---|---|
| Standard test panel | Example 16 | Comparative Example 17 |
| PP | 100/100 | 21/100 |
| Glass | 100/100 | 85/100 |

The coating obtained from the polyurethane obtained in Example 16 showed excellent adhesion as compared with the polyurethane obtained in Comparative Example 17.

EXAMPLE 17

Production of Ester Acrylate

Into a 300-mL flask made of glass equipped with a Dean-Stark trap, 99.5 g (0.05 mol) of Polyethyl vinyl ether (a) having hydroxyl groups at its both ends obtained in Reference Example 1, 50 g of toluene, 0.6 g (0.005 mol) of hydroquinone, and 0.6 g (0.003 mol) of p-toluenesulfonic acid-hydrate were charged, and the mixture was heated to 100° C. Then, 24.1 g (0.3 mol) of acrylic acid was added dropwise over 20 minutes, and the mixture was allowed to react for 15 hours under ref lux while distilling away the resulting water. After cooling the reaction mixture, an organic layer to which 210 g of toluene had been added was washed 3 times with a 5 wt % sodium hydroxide aqueous solution and 165 g of water. To the organic layer, 0.6 g of p-methoxyphenol was added, and concentrated for 30 minutes under the conditions of 50° C. and 4.1 kPa. As a result, a viscous liquid was obtained. The $^1$H-NMR of the resultant viscous liquid was measured. As a result, the peak derived from the hydroxyl group disappeared, and the peak derived from the acryl group was observed.

COMPARATIVE EXAMPLE 18

Production of Ester Acrylate

An ester acrylate was obtained in the same manner as in Example 17, except that 110 g (0.05 mol) of polyoxypropylene glycol [manufactured by SANYO CHEMICAL INDUSTRIES, Ltd., trade name: PP-2000, hydroxyl value: 55.5 mgKOH/g, number-average molecular weight: 2000] was used in place of Polyethyl vinyl ether (a) having hydroxyl groups at its both ends obtained in Reference Example 1.

TEST EXAMPLE 12

Water Resistance

The water resistance was evaluated by the use of a cured coating obtained by curing each ester acrylate obtained in Example 17 and Comparative Example 18 in the same manner as in Test Example 6. The water resistance test was carried out in the same manner as in Test Example 6.

The measurement results are shown in Table 25.

TABLE 25

| | Retention of tensile strength (%) | |
|---|---|---|
| Ester acrylate | After 7 days | After 14 days |
| Example 17 | 85 | 80 |
| Comparative Example 18 | 55 | 42 |

The cured product obtainable by curing the ester acrylate obtained in Example 17 showed excellent water resistance as compared with the cured product obtainable by curing the ester acrylate obtained in Comparative Example 18.

EXAMPLE 18

Production of Alkenyl Ether

Into a 1-L flask made of glass and equipped with a condenser tube, 400 g (0.22 mol) of Polyethyl vinyl ether (a) having hydroxyl groups at its both ends obtained in Reference Example 1, 160 g (2.2 mol) of ethyl vinyl ether, and 2.7 g (0.007 mol) of diaceto (1,10-phenanthroline) palladium were charged, and allowed to react at 30° C. for 24 hours. The reaction mixture was concentrated under reduced pressure to thereby distill away excess ethyl vinyl ether, and in a viscous liquid was obtained. The $^1$H-NMR of the resultant viscous liquid was measured. As a result, the peak derived from the hydroxyl group disappeared, and the peak derived from the alkenyl ether group was observed.

COMPARATIVE EXAMPLE 19

Production of Alkenyl Ether

An alkenyl ether was obtained in the same manner as in Example 18, except that 450 g (0.22 mol) of polyoxypropylene glycol [manufactured by SANYO CHEMICAL INDUSTRIES, Ltd., trade name: PP-2000, hydroxyl value: 55.5 mgKOH/g, number-average molecular weight: 2000] was used in place of Polyethyl vinyl ether (a) having hydroxyl groups at its both ends obtained in Reference Example 1.

TEST EXAMPLE 13

Thermal Aging Resistance

Each alkenyl ether obtained in Example 18 and Comparative Example 19 was cured in the same manner as in Test Example 7. The thermal aging resistance was evaluated by the use of each resultant cured coating. The thermal aging resistance was evaluated by placing each resultant cured coating in a 125° C. oven, and according to the changes the elpase of with time in retention of the Tensile strength in a tensile test. The tensile test was carried out in the same manner as in Test Example 6.

The measurement results are shown in Table 26.

TABLE 26

| Alkenyl ether | Retention of tensile strength (%) After 7 days |
|---|---|
| Example 18 | 103 |
| Comparative Example 19 | 70 |

The cured product obtainable by curing the alkenyl ether obtained in Example 18 showed excellent thermal aging resistance as compared with the cured product obtainable by curing the alkenyl ether obtained in Comparative Example 19.

EXAMPLE 19

Curing of Composition having an Alkenyl Ether and a Compound having a Maleimido Group The alkenyl ether obtained in Example 18 and 4,4'-bismaleimide diphenylmethane were mixed so that the ratio of the number of moles of the compound having a maleimido group to the number of moles of the alkenyl ether became 1.0. 2.0 parts by weight of IRGACURE 184 (manufactured by Ciba Speciality Chemicals) and 0.5 part by weight of IRGACURE 819 (manufactured by Ciba Speciality Chemicals) were added per 100 parts by weight of the mixture. Then, THF was added thereto to prepare a 40 wt % solution. The solution was applied onto a glass panel with a 0.254-mm applicator. The coated panel was subjected to vacuum drying in a 60° C. oven overnight, and then irradiated with an ultraviolet ray under the same conditions as with Test Example 7, resulting in a cured coating.

COMPARATIVE EXAMPLE 20

Curing of Composition having an Alkenyl Ether and a Compound having a Maleimido Group A cured coating was obtained in the same manner as in Example 19, except that the urethane alkenyl ether obtained in Comparative Example 19 was used in place of the urethane alkenyl ether obtained Example 18.

TEST EXAMPLE 14

Thermal Aging Resistance

The thermal aging resistance was evaluated by the use of each cured coating obtained in Example 19 and Comparative Example 20. The evaluation of the thermal aging resistance was carried out according to the method described in Test Example 13.

The measurement results are shown in Table 27.

TABLE 27

| Composition | Retention of tensile strength (%) After 7 days |
|---|---|
| Example 19 | 104 |
| Comparative Example 20 | 66 |

The cured coating obtained in Example 19 showed excellent thermal aging resistance as compared with the cured coating obtained in Comparative Example 20.

INDUSTRIAL AVAILABILITY

The present invention provides a polyurethane, a polyester, and the like, excellent in flexibility, compatibility with a low polarity resin, uniformity of composition, mechanical strength, solubility, stickiness, bonding property, adhesion, electrical insulation property, weather resistance, water resistance, transparency, thermal aging resistance, results in a pressure cooker test, or the like.

The invention claimed is:

1. A polyurethane having a structural unit represented by formula (I):

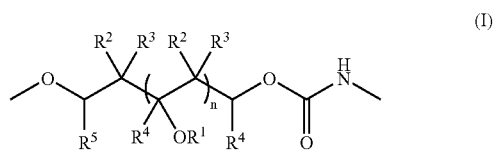

wherein n represents an integer of 2 to 1000, $R^1$ represents substituted or unsubstituted lower alkyl, substituted or unsubstituted cycloalkyl, substituted or unsubstituted aryl, or substituted or unsubstituted aralkyl, $R^2$, $R^3$ and $R^4$ independently represent a hydrogen atom, substituted or unsubstituted lower alkyl, substituted or unsubstituted cycloalkyl, substituted or unsubstituted aryl, or substituted or unsubstituted aralkyl, $R^1$s, $R^2$s, $R^3$s, and $R^4$s, when they are each present two or more in number, may be the same or different, and $R^5$ represents a hydrogen atom, substituted or unsubstituted lower alkyl, substituted or unsubstituted cycloalkyl, substituted or unsubstituted aryl, or substituted or unsubstituted aralkyl.

2. The polyurethane according to claim 1, wherein the weight-average molecular weight thereof is 30000 to 1000000.

3. An urethane acrylate having a structural unit represented by formula (XXX):

wherein n represents an integer of 2 to 1000, $R^1$ represents substituted or unsubstituted lower alkyl, substituted or unsubstituted cycloalkyl, substituted or unsubstituted aryl, or substituted or unsubstituted aralkyl, $R^2$, $R^3$ and $R^4$ independently represent a hydrogen atom, substituted or unsubstituted lower alkyl, substituted or unsubstituted cycloalkyl, substituted or unsubstituted aryl, or substituted or unsubstituted aralkyl, and $R^1$s, $R^2$s, $R^3$s, and $R^4$s, when they are each present two or more in number, may be the same or different.

4. An urethane acrylate having a structural unit represented by formula (II):

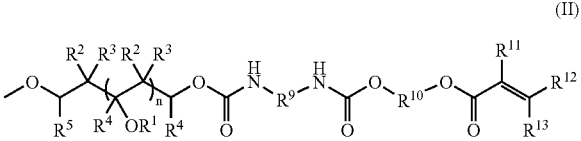

wherein n represents an integer of 2 to 1000,

R$^1$ represents substituted or unsubstituted lower alkyl, substituted or unsubstituted cycloalkyl, substituted or unsubstituted aryl, or substituted or unsubstituted aralkyl, R$^2$, R$^3$, R$^4$ and R$^5$ independently represent a hydrogen atom, substituted or unsubstituted lower alkyl, substituted or unsubstituted cycloalkyl, substituted or unsubstituted aryl, or substituted or unsubstituted aralkyl, R$^1$s, R$^2$s, R$^3$s, and R$^4$s, when they are each present two or more in number, may be the same or different, R$^9$ represents a residue derived from a polyisocyanate compound, R$^0$ represents substituted or unsubstituted lower alkylene, substituted or unsubstituted cycloalkylene, or substituted or unsubstituted arylene, and R$^{11}$, R$^{12}$ and R$^{13}$ independently represent a hydrogen atom, substituted or unsubstituted lower alkyl, substituted or unsubstituted cycloalkyl, substituted or unsubstituted aryl, or a substituted or unsubstituted aralkyl.

5. The urethane acrylate according to claim 3 or 4, wherein the number-average molecular weight thereof is 200 to 10000.

6. A composition comprising the urethane acrylate according to claim 3 or 4, and a radical photo-, or thermal polymerization initiator.

7. An urethane alkenyl ether, having a structural unit represented by formula (XXX):

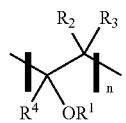

(xxx)

wherein n represents an integer of 2 to 1000,

R$^1$ represents substituted or unsubstituted lower alkyl, substituted or unsubstituted cycloalkyl, substituted or unsubstituted aryl, or substituted or unsubstituted aralkyl, R$^2$, R$^3$ and R$^4$ independently represent a hydrogen atom, substituted or unsubstituted lower alkyl, substituted or unsubstituted cycloalkyl, substituted or unsubstituted aryl, or substituted or unsubstituted aralkyl, and R$^1$s, R$^2$s, R$^3$s, and R$^4$s, when they are each present two or more in number, may be the same or different.

8. An urethane alkenyl ether having a structural unit represented by formula (XI):

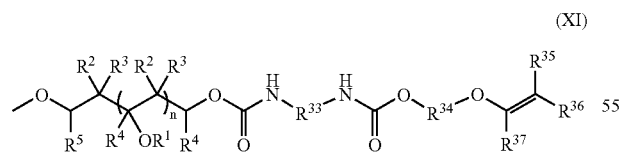

(XI)

wherein n represents an integer of 2 to 1000,

R$^1$ represents substituted or unsubstituted lower alkyl, substituted or unsubstituted cycloalkyl, substituted or unsubstituted aryl, or substituted or unsubstituted aralkyl, R$^2$, R$^3$, R$^4$ and R$^5$ independently represent a hydrogen atom, substituted or unsubstituted lower alkyl, substituted or unsubstituted cycloalkyl, substituted or unsubstituted aryl, or substituted or unsubstituted aralkyl, R$^1$s, R$^2$s, R$^3$s, and R$^4$s, when they are each present two or more in number, may be the same or different, R$^{33}$ represents a residue derived from a polyisocyanate compound, R$^{34}$ represents a substituted or unsubstituted lower alkylene, substituted or unsubstituted cycloalkylene, or substituted or unsubstituted arylene, and R$^{35}$, R$^{36}$ and R$^{37}$ independently represent a hydrogen atom, substituted or unsubstituted lower alkyl, substituted or unsubstituted cycloalkyl, substituted or unsubstituted aryl or substituted or unsubstituted aralkyl.

9. The urethane alkenyl ether according to claim 7 or 8 wherein the number-average molecular weight thereof is 200 to 10000.

10. A composition comprising the urethane alkenyl ether according to claim 7 or 8, and a polymerization initiator generating an acid through heating or light irradiation.

11. A composition comprising the urethane alkenyl ether according to claim 7 or 8, and a compound having a maleimido group.

12. A polyester having a structural unit represented by formula (III):

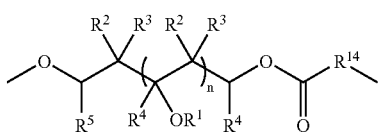

(III)

wherein n represents an integer of 2 to 1000,

R$^1$ represents substituted or unsubstituted lower alkyl, substituted or unsubstituted cycloalkyl, substituted or unsubstituted aryl, or substituted or unsubstituted aralkyl, R$^2$, R$^3$, R$^4$ and R$^5$ independently represent a hydrogen atom, substituted or unsubstituted lower alkyl, substituted or unsubstituted cycloalkyl, substituted or unsubstituted aryl, or substituted or unsubstituted aralkyl, R$^1$s, R$^2$s, R$^3$s, and R$^4$s, when they are each present two or more in number, may be the same or different, and R$^{14}$ represents substituted or unsubstituted lower alkylene, substituted or unsubstituted cycloalkylene, or substituted or unsubstituted arylene.

13. The polyester according to claim 12, wherein the weight-average molecular weight thereof is 30000 to 1000000.

14. An ester acrylate having a structural unit represented by formula (IV):

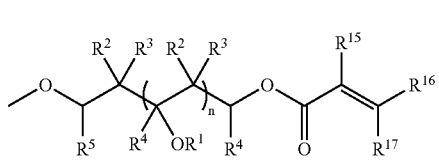

(IV)

wherein n represents an integer of 2 to 1000,

R$^1$ represents substituted or unsubstituted lower alkyl, substituted or unsubstituted cycloalkyl, substituted or unsubstituted aryl, or substituted or unsubstituted aralkyl, R$^2$, R$^3$, R$^4$ and R$^5$ independently represent a hydrogen atom, substituted or unsubstituted lower alkyl, substituted or unsubstituted cycloalkyl, substituted or unsubstituted aryl, or substituted or unsubstituted aralkyl, $R^1$s, $R^2$s, $R^3$s, and $R^4$s, when they are each present two or more in number, may be the same or different, and $R^{15}$, $R^{16}$, and $R^{17}$ independently represent a hydrogen atom, substituted or unsubstituted lower alkyl, substituted or unsubstituted cycloalkyl, substituted or unsubstituted aryl, or substituted or unsubstituted aralkyl.

15. The ester acrylate according to claim 14, wherein the number-average molecular weight thereof is 200 to 10000.

16. A composition comprising the ester acrylate according to claim 14, and a radical photo-, or thermal polymerization initiator.

17. An alkenyl ether having a structural unit represented by formula (V):

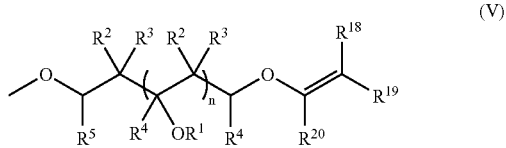

wherein n represents an integer of 2 to 1000, $R^1$ represents substituted or unsubstituted lower alkyl, substituted or unsubstituted cycloalkyl, substituted or unsubstituted aryl, or substituted or unsubstituted aralkyl, $R^2$, $R^3$, $R^4$ and $R^5$ independently represent a hydrogen atom, substituted or unsubstituted lower alkyl, substituted or unsubstituted cycloalkyl, substituted or unsubstituted aryl, or substituted or unsubstituted aralkyl, $R^1$s, $R^2$s, $R^3$s, and $R^4$s, when they are each present two or more in number, may be the same or different, and $R^{18}$, $R^{19}$, and $R^{20}$ independently represent a hydrogen atom, substituted or unsubstituted lower alkyl, substituted or unsubstituted cycloalkyl, substituted or unsubstituted aryl, or substituted or unsubstituted aralkyl.

18. The alkenyl ether according to claim 17, wherein the number-average molecular weight thereof is 200 to 10000.

19. A composition comprising the alkenyl ether according to claim 17 and a polymerization initiator generating an acid through heating or light irradiation.

20. A composition comprising the alkenyl ether according to claim 17 and a compound having a maleimido group.

21. A composition comprising the urethane acrylate according to claim 5, and a radical photo-, or thermal polymerization initiator.

22. A composition comprising the urethane alkenyl ether according to claim 9, and a polymerization initiator generating an acid through heating or light irradiation.

23. A composition comprising the urethane alkenyl ether according to claim 9, and a compound having a maleimido group.

24. A composition comprising the ester acrylate according to claim 15, and a radical photo-, or thermal polymerization initiator.

25. A composition comprising the alkenyl ether according to claim 18 and a polymerization initiator generating an acid through heating or light irradiation.

26. A composition comprising the alkenyl ether according to claim 18 and a compound having a maleimido group.

* * * * *

UNITED STATES PATENT AND TRADEMARK OFFICE
CERTIFICATE OF CORRECTION

| | |
|---|---|
| PATENT NO. | : 7,119,160 B2 |
| APPLICATION NO. | : 10/506891 |
| DATED | : October 10, 2006 |
| INVENTOR(S) | : Sai Kodama et al. |

It is certified that error appears in the above-identified patent and that said Letters Patent is hereby corrected as shown below:

ON THE TITLE PAGE [57] ABSTRACT:

Line 2, ", aor the like" should be deleted; and
Line 9, "represent" should read --represents--.

COLUMN 2:

Line 27, "An" should read --A--;
Line 29, "also" should read --can also--;
Line 31, "An" should read --A--;
Line 49, "represent" should read --represents--;
Line 61, "An" should read --A--;
Line 63, "also" should read --can also--;
Line 64, "reffered" should read --referred--; and
Line 66, "An" should read --A--.

COLUMN 3:

Line 38, "also" should read --can also--; and
Line 65, "also be, referred" should read --can also be referred--.

COLUMN 4:

Line 12, "represent" should read --represents--.

COLUMN 5:

Line 36, "mention" should read --mention can--.

COLUMN 6:

Line 25, "denote" should read --denotes--.

COLUMN 7:

Line 22, "to" should be deleted.

UNITED STATES PATENT AND TRADEMARK OFFICE
CERTIFICATE OF CORRECTION

PATENT NO. : 7,119,160 B2
APPLICATION NO. : 10/506891
DATED : October 10, 2006
INVENTOR(S) : Sai Kodama et al.

It is certified that error appears in the above-identified patent and that said Letters Patent is hereby corrected as shown below:

COLUMN 8:

Line 22, "are" should be deleted;
Line 39, "included" should read --includes--;
Line 42, "included" should read --includes--
Line 46, "mentioned" should read --mentioned is--;
Line 52, "included" should read --includes those--; and
Line 67, "mention" should read --mention can--.

COLUMN 9:

Line 2, "mention" should read --mention can--;
Line 16, "include" should read --examples include--;
Line 17, "As" should read --as--;
Line 21, "ether,examples" should read --ether, examples--;
Line 37, "0.00001" should read --0.0001--; and
Line 40, "be" should read --may be--.

COLUMN 14:

Line 26, "be" should read --may be--.

COLUMN 15:

Line 19, "To a" should read --Toa--;
Line 43, "If" should read --if -- and "be" should read --may be--;
Line 44, "be" should read --may be--;
Line 49, "a" (first occurrence) should read --A--; and
Line 50, "be" should read --may be--.

COLUMN 16:

Line 2, "containes" should read --contained--.

COLUMN 17:

Line 2, "be" should read --may be--;
Line 7, "be" should read --may be--;
Line 32, "above.)," should read --above),--;
Line 38, "be" should read --may be--; and
Line 61, "be" should read --may be--.

UNITED STATES PATENT AND TRADEMARK OFFICE
CERTIFICATE OF CORRECTION

| | |
|---|---|
| PATENT NO. | : 7,119,160 B2 |
| APPLICATION NO. | : 10/506891 |
| DATED | : October 10, 2006 |
| INVENTOR(S) | : Sai Kodama et al. |

It is certified that error appears in the above-identified patent and that said Letters Patent is hereby corrected as shown below:

COLUMN 22:

Line 12, "contain," should read --contains,--.

COLUMN 25:

Line 16, "preferred to." should read --preferred.--; and
    Line 50, "E)can" should read --E) can--.

COLUMN 28:

Line 27, "antioxidant," should read --antioxidants,--; and
    Line 29, "be" should read --may be--.

COLUMN 31:

Line 38, "micron" should read --microns--.

COLUMN 32:

Line 5, "THF solubility:" should read --¶ THF solubility--.

COLUMN 36:

Line 42, "polyurathane" should read --polyurethane--; and
    Line 50, "urathane" should read --urethane--.

COLUMN 37:

Line 46, "Tensile" (both occurrences) should read --tensile--.

COLUMN 38: .

Line 49, "An" should read --a--; and
    Line 60, "An" should read --a--.

UNITED STATES PATENT AND TRADEMARK OFFICE
CERTIFICATE OF CORRECTION

PATENT NO. : 7,119,160 B2
APPLICATION NO. : 10/506891
DATED : October 10, 2006
INVENTOR(S) : Sai Kodama et al.

It is certified that error appears in the above-identified patent and that said Letters Patent is hereby corrected as shown below:

COLUMN 40:

Line 55, "SUMIDURN" should read --SUMIDUR N-- and "be" should read --may be--;
Line 58, "be" should read --may be--; and
Line 60, "be" should read --may be--.

COLUMN 42:

Line 4, "ether a" should read --ether (a)--.

COLUMN 43:

Line 3, "be" should read --may be--;
Line 21, "Test panel" should read --Testpanel--;
Line 60, "at-its" should read --at its--; and
Line 67, "an" should read --a--.

COLUMN 44:

Line 38, "Example" should read --Example 1.--; and
Line 39, "1." should be deleted.

COLUMN 45:

Line 29, "ref lux" should read --reflux--.

COLUMN 48:

Line 33, "An" should read --A--; and
Line 56, "An" should read --A--.

COLUMN 49:

Line 13, "$R^0$" should read --$R^{10}$--;
Line 26, "An" should read --A--; and
Line 47, "An" should read --A--.

UNITED STATES PATENT AND TRADEMARK OFFICE
CERTIFICATE OF CORRECTION

PATENT NO. : 7,119,160 B2
APPLICATION NO. : 10/506891
DATED : October 10, 2006
INVENTOR(S) : Sai Kodama et al.

It is certified that error appears in the above-identified patent and that said Letters Patent is hereby corrected as shown below:

<u>COLUMN 52</u>:

Line 3, "$R^{18,} R^{19,}$" should read --$R^{18}$, $R^{19}$,--;
Line 10, "claim 17" should read --claim 17,--;
Line 13, "claim 17" should read --claim 17,--;
Line 28, "claim 18" should read --claim 18,--; and
Line 31, "claim 18" should read --claim 18,--.

Signed and Sealed this

Seventeenth Day of April, 2007

JON W. DUDAS
*Director of the United States Patent and Trademark Office*